United States Patent
Nakamura et al.

(10) Patent No.: US 9,437,876 B2
(45) Date of Patent: Sep. 6, 2016

(54) PRODUCTION METHOD OF ELECTRODE CATALYST, ELECTRODE CATALYST, COMPOSITION FOR FORMING GAS DIFFUSION ELECTRODE, GAS DIFFUSION ELECTRODE, MEMBRANE-ELECTRODE ASSEMBLY (MEA), AND FUEL CELL STACK

(71) Applicant: N.E. Chemcat Corporation, Tokyo (JP)

(72) Inventors: Yoko Nakamura, Bando (JP);
Kiyotaka Nagamori, Bando (JP);
Tomoteru Mizusaki, Bando (JP);
Takuya Tsubaki, Bando (JP)

(73) Assignee: N.E. CHEMCAT CORPORATION, Tokyo (JP)

( * ) Notice: Subject to any disclaimer, the term of this patent is extended or adjusted under 35 U.S.C. 154(b) by 0 days.

(21) Appl. No.: 15/022,753

(22) PCT Filed: Mar. 27, 2015

(86) PCT No.: PCT/JP2015/059811
§ 371 (c)(1),
(2) Date: Mar. 17, 2016

(87) PCT Pub. No.: WO2015/147309
PCT Pub. Date: Oct. 1, 2015

(65) Prior Publication Data
US 2016/0233516 A1 Aug. 11, 2016

(30) Foreign Application Priority Data

Mar. 28, 2014 (JP) ................................ 2014-070627

(51) Int. Cl.
*B01J 23/38* (2006.01)
*B01J 23/42* (2006.01)
(Continued)

(52) U.S. Cl.
CPC .......... *H01M 4/8657* (2013.01); *H01M 4/8825* (2013.01); *H01M 4/921* (2013.01); *H01M 4/926* (2013.01)

(58) Field of Classification Search
CPC .......... B01J 23/38; B01J 23/42; B01J 23/44; B01J 23/52; B01J 23/755; B01J 23/892; B01J 35/0033; B01J 35/008; B01J 35/0086; B01J 37/00

USPC ........ 502/184, 101, 337, 339, 344; 420/463, 420/466, 468, 507–510
See application file for complete search history.

(56) References Cited

U.S. PATENT DOCUMENTS

2006/0042957 A1  3/2006  He
2010/0197488 A1*  8/2010  Hagemeyer ................ B01J 2/16
                                                    502/242

(Continued)

FOREIGN PATENT DOCUMENTS

JP      2002249488 A    9/2002
JP      2003129102 A    5/2003

(Continued)

OTHER PUBLICATIONS

Matsuoka et al., "Degradation of Polymer Electrolyte Fuel Cells under the Existence of Anion Species", J. Power Sources, 2008.05.01, vol. 179 No. 2, p. 560-565.

(Continued)

*Primary Examiner* — Patricia L Hailey
(74) *Attorney, Agent, or Firm* — Troutman Sanders LLP

(57) ABSTRACT

Provided is a production method of an electrode catalyst that can reduce the content of chlorine species reliably and sufficiently through a simple operation, even when using an electrode catalyst precursor containing a high concentration of chlorine (Cl) species as a raw material of the electrode catalyst. The production method of the electrode catalyst has a core-shell structure including a core part formed on a support and a shell part formed to cover at least a part of a surface of the core part. The production method includes a first step (1) of preparing a first liquid with an electrode catalyst precursor (I) being dispersed in ultrapure water by adding the electrode catalyst precursor (I) to the ultrapure water, the electrode catalyst precursor (I) being produced using a material containing chlorine (Cl) species, and exhibiting a chlorine (Cl) species concentration not lower than a first chlorine (Cl) species concentration when measured by X-ray fluorescence (XRF) spectroscopy; and a second step (2) of preparing a second liquid by dispersing an electrode catalyst precursor (II), the electrode catalyst precursor (II) being obtained by filtrating and washing the electrode catalyst precursor (I) contained in the first liquid with ultrapure water, and then performing washing until an electric conductivity ρ of a filtrate has become a first value or lower.

20 Claims, 8 Drawing Sheets

(51) Int. Cl.
*B01J 23/44* (2006.01)
*B01J 23/52* (2006.01)
*B01J 23/755* (2006.01)
*B01J 37/00* (2006.01)
*H01M 4/86* (2006.01)
*H01M 4/92* (2006.01)
*H01M 4/88* (2006.01)

(56) References Cited

U.S. PATENT DOCUMENTS

| | | | | |
|---|---|---|---|---|
| 2011/0275009 | A1* | 11/2011 | Goto | B01J 23/42 429/506 |
| 2013/0189607 | A1* | 7/2013 | Sakai | B01J 21/063 429/524 |
| 2015/0037711 | A1* | 2/2015 | Cho | B22F 1/025 429/523 |
| 2015/0372313 | A1* | 12/2015 | Shao | B01J 23/44 429/524 |

FOREIGN PATENT DOCUMENTS

| | | |
|---|---|---|
| JP | 2008511534 A | 4/2008 |
| JP | 2008126211 A | 6/2008 |
| JP | 2008293737 A | 12/2008 |
| JP | 2009238560 A | 10/2009 |
| JP | 2010214330 A | 9/2010 |
| JP | 2011526655 A | 10/2011 |
| JP | 2011218278 A | 11/2011 |
| JP | 2013215701 A | 10/2013 |
| JP | 2014239033 A | 12/2014 |
| WO | 2006026144 A1 | 3/2006 |
| WO | 2011115012 A1 | 9/2011 |
| WO | 2014181873 A1 | 11/2014 |

OTHER PUBLICATIONS

PCT International Search Report mailed on Jun. 23, 2015 issued in corresponding PCT Application No. PCT/JP2015/059811.

* cited by examiner

PRODUCTION METHOD OF ELECTRODE CATALYST, ELECTRODE CATALYST, COMPOSITION FOR FORMING GAS DIFFUSION ELECTRODE, GAS DIFFUSION ELECTRODE, MEMBRANE-ELECTRODE ASSEMBLY (MEA), AND FUEL CELL STACK

CROSS-REFERENCE TO RELATED APPLICATIONS

This application is a U.S. National Stage of International Application No. PCT/JP2015/059811, filed Mar. 27, 2015, which claims the benefit of Japanese Patent Application No. 2014-070627, filed Mar. 28, 2014, the entire contents of each of which are hereby incorporated by reference.

TECHNICAL FIELD

The present invention relates to a production method of electrode catalyst. Also, the present invention relates to an electrode catalyst obtained by the production method of the electrode catalyst, a composition for forming a gas diffusion electrode including the electrode catalyst, a gas diffusion electrode, a membrane-electrode assembly (MEA), and a fuel cell stack.

BACKGROUND ART

A so-called polymer electrolyte fuel cell (Polymer Electrolyte Fuel Cell: hereinafter called "PEFC" as needed), has its operating temperature of from a room temperature to about 80° C. Also, since PEFC makes it possible to employ inexpensive general-purpose plastics, etc. for members constituting its fuel cell body, it is possible to realize reduction in weight. Furthermore, PEFC makes it possible to achieve thinning of a polymer electrolyte membrane, enabling an electric resistance to be reduced, thereby enabling a power loss to be reduced relatively easily. Due to PEFC having not a few advantages as described above, it is applicable to a fuel cell vehicle, a home cogeneration system, and the like.

As an electrode catalyst for PEFC, there has been proposed an electrode catalyst in which a platinum (Pt) or platinum (Pt) alloy, i.e., a component for the electrode catalyst, is supported on a carbon serving as a support (for example, Non-Patent Document 1).

Conventionally, there have been disclosed that, as for an electrode catalyst for PEFC, if the content of chlorine contained in the electrode catalyst is 100 ppm or more, it is not desirable as an electrode catalyst (for example, Patent Document 3); and that this is because if the content of chlorine contained in the electrode catalyst is 100 ppm or more, it is impossible to obtain a sufficient catalytic activity for the electrode catalyst for fuel cells; and corrosion of its catalyst layer will occur, thus shortening the life of the fuel cell.

Then, there is proposed a PEFC equipped with a membrane electrode assembly with electrodes joined on both sides of an electrolyte membrane, in which acid radical protons contained in an inner-catalyst-layer electrolyte are partially exchanged by phosphonium ion (for example, Patent Document 1). In the PEFC, the counter anion of the phosphonium ion is a compound containing no halogen elements. The reason, as disclosed therein, is because a halogen element causes degradation in battery performance if it remains in the electrode.

Also, there is proposed a PEFC equipped with a membrane electrode assembly (MEA) with electrodes including a catalyst layer joined on both sides of an electrolyte membrane, (for example, Patent Document 2). Pd and Pt as a catalyst component of the Pd/Pt particles contained in the catalyst layer of the PEFC are derived from a halide.

Thus, the method of manufacturing the Pd/Pt particles described in Patent Document 2 employs a halogen-free compound for an ion-exchange liquid used in preparing Pd and Pt. Patent Document 2 discloses that the use of halogen should be avoided because halogen ion degrades battery performance. Patent Document 2 discloses warm water cleaning as a method for deionization treatment with respect to halogen.

Then, there is disclosed a method for preparation of a powder of platinum (Pt) or platinum (Pt) alloy that contains less than 100 ppm of chlorine as the catalyst component of the electrode catalyst (for example, Patent Document 3).

As for the preparation of a powder of the platinum (Pt) or platinum (Pt) alloy, there is disclosed the following method: forming a melt which contains a low-melting mixture of alkali-metal nitrate, a chlorine-free platinum compound and a chlorine-free compound of alloying elements; heating the melt up to a reaction temperature at which the platinum compound and the compound of the alloying elements are thermally decomposed to give an oxide; cooling the melt; and the melt is dissolved in water and the resulting oxide or mixed oxides are converted into a powder of platinum or platinum alloy by successive reduction.

Whereas, it becomes important in the future development of PEFC, to pursue reduction of cost in a variety of ways, while maintaining or improving power generation performance toward the practical use thereof.

For this reason, study from the same point of view becomes so important in the development of electrode catalyst as well that there has been conducted the study of an electrode catalyst having a so-called core-shell structure (core-shell catalyst) (for example, Patent Document 4, Patent Document 5). In manufacturing processes of such core-shell catalyst, a metal chloride salt is often used as a raw material.

For example, Patent Document 4 and Patent Document 5 disclose a core-shell catalyst employing palladium as a constituent element of a core part and platinum as a constituent element of a shell part, showing, as one example of a raw material for such shell part, potassium chloroplatinate.

For such core-shell catalyst employing palladium as a constituent element of the core part, and platinum as a constituent element of the shell part, there are often employed, as a raw material, materials containing chloride (Cl) species such as platinum (Pt) chloride salt, palladium (Pd) chloride salt. This is presumably due to the fact that the chloride salts of platinum (Pt) and palladium (Pd) are easily available, and easy to use under their manufacturing conditions, resulting in comparatively low cost of raw materials. For this reason, it is difficult to respond to the need to let the core-shell catalyst exhibit sufficient catalytic activity, by positively choosing, as a starting material, a compound containing no halogen elements (particularly chlorine).

Meanwhile, the present applicant submits, as publications where the above-mentioned publicly-known inventions are described, the following publications:

PRIOR ART DOCUMENT

Patent Documents

Patent Document 1: Japanese Unexamined Patent Application Publication No. 2009-238560 (Japanese patent No. 5358997)

Patent Document 2: Japanese Unexamined Patent Application Publication No. 2008-293737 (Japanese patent No. 5169025)

Patent document 3: Japanese Un-examined Patent Application Publication No. 2003-129102 (Japanese patent No. 4286499)

Patent document 4: Japanese Unexamined Patent Application Publication (Translation of PCT Application) No. 2011-526655

Patent document 5: Japanese Unexamined Patent Application Publication No. 2013-215701

Non-Patent Document

Non-Patent Document 1: MATSUOKA et al., "Degradation of Polymer Electrolyte Fuel Cells under the Existence of Anion Species", J. Power Sources, 2008, May 1, Vol. 179 No. 2, P. 560-565

SUMMARY OF THE INVENTION

Problem to be Solved by the Invention

In view of the above technical background, particularly for an electrode catalyst having a so-called core-shell structure, it is imperative to study a process for manufacturing an electrode catalyst that can reliably and sufficiently reduce the content of chlorine (Cl) species while using chloride salts of metal such as platinum (Pt) and palladium (Pd) as a raw material (Pt).

However, there have heretofore been no sufficient studies conducted on such process for manufacturing an electrode catalyst having a core-shell structure which can reliably and sufficiently reduce the content of chlorine (Cl) species through a relatively simple method, and hence there has been room for improvement.

For example, Patent Document 1 discloses that a halogen element causes degradation of battery performance when it remains in an electrode. However, Patent Document 1 only refers to warm water cleaning or the like as a method for removal of such halogen element, and no specific measures are described therein.

Further, Patent Document 2 merely discloses a case where a halide is used as a raw material of an electrode catalyst, and no particular dehalogenation treatment (washing) is performed, or a case where no halogen compound is used as a raw material of an electrode catalyst, and yet, acid, water washing is performed. Furthermore, there has been such a disadvantage that you have to employ the method for producing an electrode catalyst involving such a complex process for removal of chlorine as disclosed in Patent Document 3, etc. in order to produce an electrode catalyst containing powders of platinum (Pt), etc. that contain less than 100 ppm of chlorine.

The present invention has been made in view of the above-mentioned technical context, and it is an object of the present invention to provide a production method of an electrode catalyst that can reduce the content of chlorine species reliably and sufficiently through a relatively simple operation, even when using an electrode catalyst precursor containing a relatively high concentration of chlorine (Cl) species as a raw material of the electrode catalyst. It is another object of the present invention to provide an electrode catalyst obtained by the aforesaid electrode catalyst production method, a gas diffusion electrode forming composition, a gas diffusion electrode, a membrane-electrode assembly (MEA), and a fuel cell stack including such electrode catalyst.

Means for Solving the Problem

The present inventors, as a result of having performed intensively studies, came up with the following findings on an electrode catalyst having a core-shell structure, and have completed the present invention.

That is, the present inventors found out that it is possible to reduce the chlorine (Cl) species content of the resultant electrode catalyst reliably and sufficiently, and have completed the present invention by subjecting a liquid containing ultrapure water and an electrode catalyst precursor exhibiting a relatively high chlorine (Cl) species concentration (e.g, concentrations not lower than 6,000 ppm) when measured by X-ray fluorescence (XRF) spectroscopy, to filtrating and washing treatment under certain conditions.

More specifically, the present invention comprises the following technical matters:

That is, the present invention provides:

(1) a production method of an electrode catalyst having a core-shell structure including a support, a core part formed on said support and a shell part formed to cover at least a part of a surface of said core part, comprising: a first step (1) of preparing a first liquid with an electrode catalyst precursor (I) being dispersed in ultrapure water by adding said electrode catalyst precursor (I) to the ultrapure water, said electrode catalyst precursor (I) being produced using a material containing chlorine (Cl) species, and exhibiting a chlorine (Cl) species concentration not lower than a predetermined first chlorine (Cl) species concentration when measured by X-ray fluorescence (XRF) spectroscopy; and a second step (2) of preparing a second liquid by dispersing an electrode catalyst precursor (II) in ultrapure water, said electrode catalyst precursor (II) being obtained by filtrating and washing said electrode catalyst precursor (I) contained in said first liquid with ultrapure water, and then repeatedly performing washing until an electric conductivity ρ of a filtrate obtained after washing has become a first predetermined value or lower when measured by a JIS-standard testing method (JIS K0552).

According to the production method of the present invention, it is possible for an electrode catalyst, as a resultant product, to have its chlorine (Cl) species content reliably and sufficiently reduced, through relatively simple operations.

That is, according to the production method of the present invention, it is possible for an electrode catalyst, as a resultant product, to have its chlorine (Cl) species content reduced reliably and sufficiently, through such relatively simple operations as: repeatedly performing washing until an electric conductivity has become a predetermined value or lower with respect to the liquid obtained by dispersing the electrode catalyst precursor in ultrapure water; drying the filtered product obtained through the washing treatment and then dispersing it in ultrapure water again; changing the temperature of liquid in performing these washing treatment and re-dispersing treatment, as needed.

Further, according to the present invention, it is possible to reduce the chlorine (Cl) species content reliably and sufficiently, thus easily enabling the catalytic activity of the resultant electrode catalyst to be fully prevented from being reduced by the influence of the chloride (Cl) species.

Furthermore, the production method of the present invention makes it possible to implement the production of an electrode catalyst under relatively clean conditions such as the condition that no reagent be used for removing chlorine, or the condition that even if an acid or the like is used, it should be at a relatively low concentration, and can be easily washed off with ultrapure water. From this point of view, therefore, the production method of the present invention is suitable for mass production of electrode catalysts, and is also suitable for reduction of the production costs.

Here in the present invention, the chlorine (Cl) species refers to a chemical species containing chlorine as a constituent element. Specifically, the chemical species containing chlorine include chlorine atom (Cl), chlorine molecule ($Cl_2$), chloride ion ($Cl^-$), chlorine radical (Cl.), polyatomic chloride ion and a chlorine compound (e.g. X—Cl where X represents a counterion).

In the present invention, chlorine (Cl) species concentration is measured by X-ray fluorescence (XRF) spectrometry. A value of the chlorine (Cl) species contained in the electrode catalyst that is measured by X-ray fluorescence (XRF) spectrometry is the concentration of chlorine (Cl) species. Here, the chlorine (Cl) species concentration is concentrations of the chlorine atoms in terms of the chlorine element that are contained in the electrode catalyst.

Further, the present invention provides:

(2) the production method of the electrode catalyst according to (1), wherein said first chlorine (Cl) species concentration is 6,000 ppm. This concentration value of the first chlorine (Cl) species is supported by the result of a comparative example described later.

Also, the present invention provides:

(3) the production method of the electrode catalyst according to (1) or (2), wherein said predetermined value is a value selected from the range of not higher than 100 μS/cm.

Also, the present invention provides:

(4) the production method of the electrode catalyst according to any one of (1) to (3), wherein said electrode catalyst precursor (I) used in said first step is subjected to a pretreatment process comprising:

a step (P1) of preparing a P1 liquid with an electrode catalyst precursor (PI) being dispersed in ultrapure water by adding said electrode catalyst precursor (PI) to the ultrapure water, said electrode catalyst precursor (PI) being produced using a material containing chlorine (Cl) species, and exhibiting a chlorine (Cl) species concentration not lower than a predetermined second chlorine (Cl) species concentration when measured by X-ray fluorescence (XRF) spectroscopy;

a step (P2) of preparing a P2 liquid by dispersing an electrode catalyst precursor (PII) in ultrapure water, said electrode catalyst precursor (PII) being obtained by filtrating and washing said electrode catalyst precursor (PI) contained in said P1 liquid with ultrapure water, and then repeatedly performing washing until an electric conductivity ρ of a filtrate obtained after washing has become a predetermined value of the step P1 or lower when measured by the JIS-standard testing method (JIS K0552); and a step (P3) of drying said P2 liquid.

As described above, the present inventors found out that it is possible to reduce the chlorine (Cl) species content of the electrode catalyst more reliably, by drying the dispersion liquid obtained after the step (P2) once in the step (P3), and then dispersing it in the ultrapure water again (so-called reslurrying) in the first step.

The present inventors assume that there still exist, in the first step (and the second step subsequent thereto), some portions in the electrode catalyst precursor powder that are not thoroughly cleaned (for example, some pore surfaces of the powder not successfully contacted by the ultrapure water) notwithstanding being in such state as being dispersed in the ultrapure water and held therein (or thereafter being in such state as being filtered and washed with the ultrapure water).

And, the present inventors assume that by drying the dispersion liquid obtained after the step (P2) once in the step (P3), and then reslurrying the resultant electrode catalyst precursor powder using the ultrapure water in the first step, at least a part of the portions that were not thoroughly cleaned in the preceding steps is allowed to be contacted by the ultrapure water for the first time, and washed.

Also, the present invention provides:

(5) the production method of the electrode catalyst according to (4), wherein said second chlorine (Cl) species concentration is 6,000 ppm.

Also, the present invention provides:

(6) the production method of the electrode catalyst according to (4) or (5), wherein said predetermined value of the step P1 is a value selected from the range of not higher than 100 μS/cm.

Also, the present invention provides:

(7) the production method of the electrode catalyst according to any one of (1) to (6), further comprising a third step (3) of drying said second liquid obtained after said second step.

Also, the present invention provides:

(8) the production method of the electrode catalyst according to (7), further comprising a fourth step (4) of preparing a third liquid with said electrode catalyst precursor (II) being dispersed in ultrapure water, by adding said electrode catalyst precursor (II) obtained after said third step (3) to the ultrapure water.

As described above, the present inventors found out that it is possible to reduce the chlorine (Cl) species content in the electrode catalyst precursor more reliably by drying the dispersion liquid obtained after the step (2) once in the step (3), and then dispersing it again in the ultrapure water (so-called reslurrying) in the fourth step.

That is, there can be obtained the same effect as the one obtained by the reslurrying as referred to in the description of the implementation of the first step after the step (P3)

Also, the present invention provides:

(9) the production method of the electrode catalyst according to (8), further comprising:

a fifth step (5) of preparing, after said fourth step (4), a fourth liquid with an electrode catalyst precursor (IV) being dispersed in ultrapure water, said electrode catalyst precursor (IV) being obtained by filtrating and washing an electrode catalyst precursor (III) contained in said third liquid with ultrapure water of a temperature of 60° C. to a boiling point thereof, and then repeatedly performing washing until an electric conductivity ρ of a filtrate obtained after washing has become a second predetermined value or lower; and a sixth step (6) of drying said fourth liquid.

Also, the present invention provides:

(10) the production method of the electrode catalyst according to (9), wherein said second predetermined value is a value selected from the range of not higher than 100 μS/cm.

Also, the present invention provides:

(11) the production method of the electrode catalyst according to (9) or (10), further comprising a seventh step (7) established between said fifth step (5) and said drying step (6), said seventh step (7) allowing said fourth liquid to be retained under at least one stage of a temperature predetermined within a range of 60° C. to a boiling point thereof for a predetermined retention time.

Also, the present invention provides:

(12) the production method of the electrode catalyst according to any one of (1) to (11), further comprising a first step' (1') established before said first step, said first step' (1') allowing an electrode catalyst precursor ($I_0$) to be dispersed in an aqueous solution obtained by adding to ultrapure water at least one kind of acid selected from the group consisting of a sulfuric acid and a nitric acid, and then retained under at least one stage of a temperature predetermined within a range of 10 to 95° C. for a predetermined retention time.

Also, the present invention provides:

(13) the production method of the electrode catalyst according to any one of (1) to (12), wherein said shell part contains at least one metal selected from platinum (Pt) and a platinum (Pt) alloy, and said core part contains at least one metal selected from the group consisting of palladium (Pd), a palladium (Pd) alloy, a platinum (Pt) alloy, gold (Au), nickel (Ni) and a nickel (Ni) alloy.

Also, the present invention provides:

(14) the production method of the electrode catalyst according to (13), wherein a platinum (Pt) chloride is used as a raw material of a metal constituting said shell part.

Also, the present invention provides:

(15) the production method of the electrode catalyst according to any one of (1) to (14), wherein said shell part has:

a first shell part formed to cover at least a part of the surface of said core part; and a second shell part formed to cover at least a part of a surface of said first shell part.

Also, the present invention provides:

(16) the production method of the electrode catalyst according to (15), wherein a platinum (Pt) chloride is used as a raw material of a metal constituting said second shell part.

Also, the present invention provides:

(17) an electrode catalyst produced by the production method of the electrode catalyst according to any one of (1) to (16).

Also, the present invention provides:

(18) a composition for forming a gas diffusion electrode, containing the electrode catalyst produced by the production method of the electrode catalyst according to any one of (1) to (16).

Also, the present invention provides:

(19) a gas diffusion electrode containing the electrode catalyst produced by the production method of the electrode catalyst according to any one of (1) to (16).

Also, the present invention provides:

(20) a membrane-electrode assembly (MEA) including the gas diffusion electrode as set forth in (19).

Also, the present invention provides:

(20) a fuel cell stack including the membrane-electrode assembly (MEA) as set forth in (20).

Effect of the Invention

According to the production method of the electrode catalyst of the present invention, even when using an electrode catalyst precursor having a high-concentration chlorine (Cl) species content (e.g., of not lower than 6000 ppm) as a material for the electrode catalyst, there can be obtained an electrode catalyst whose chlorine (Cl) species content has been reliably and sufficiently reduced, through relatively simple operations.

That is, according to the production method of the present invention, it is possible for an electrode catalyst, as a resultant product, to have its chlorine (Cl) species content reduced reliably and sufficiently, through such relatively simple operations as: repeatedly performing washing until an electric conductivity has become a predetermined value or lower with respect to the liquid obtained by dispersing the electrode catalyst precursor in ultrapure water; drying the filtered product obtained through the washing treatment and then dispersing it in ultrapure water again; changing the temperature of liquid in performing these washing treatment and re-dispersing treatment, as needed.

Further, according to the present invention, it is possible to reduce the chlorine (Cl) species content reliably and sufficiently, thus easily enabling the catalytic activity of the resultant electrode catalyst to be fully prevented from being reduced by the influence of the chloride (Cl) species.

Furthermore, the production method of the present invention makes it possible to implement the production of an electrode catalyst under relatively clean conditions such as the condition that no reagent be used for removing chlorine, or the condition that even if an acid or the like is used, it should be at a relatively low concentration, and can be easily washed off with ultrapure water. From this point of view, therefore, the production method of the present invention is suitable for mass production of electrode catalysts, and is also suitable for reduction of the production costs.

Furthermore, the present invention makes it possible to provide an electrode catalyst containing a reduced concentration of chlorine (Cl) species, composition for forming gas diffusion electrode containing the electrode catalyst, gas diffusion electrode, membrane-electrode assembly (mea), and fuel stack

MODE FOR CARRYING OUT THE INVENTION

Hereinafter, with reference to the accompanying drawings, there will be described preferred embodiments of the present invention in detail. First, a production method of an electrode catalyst of the present invention will be described, and then an electrode catalyst or the like obtained by such production method of the electrode catalyst will be described.

<Production Method of Electrode Catalyst>

A production method of the electrode catalyst of the present invention includes a first step and a second step. The first step (1) is to prepare a first liquid with an electrode catalyst precursor (I) being dispersed in ultrapure water. The first liquid is prepared by adding such electrode catalyst precursor (I) to the ultrapure water. Here, the electrode catalyst precursor (I) is produced using a material containing chlorine (Cl) species, and exhibits a chlorine (Cl) species concentration equivalent to a predetermined first chlorine (Cl) species concentration (e.g. a concentration of not lower than 6,000 ppm) when measured by X-ray fluorescence (XRF) spectroscopy. The second step (2) is to prepare a second liquid by dispersing an electrode catalyst precursor (II) in a ultrapure water. Specifically, the electrode catalyst precursor (II) is obtained as follows. That is, the electrode catalyst precursor (I) contained in the first liquid is filtrated and washed using the ultrapure water, followed by repeatedly washing the same until a filtrate obtained after washing has exhibited an electric conductivity ρ that is equivalent to or lower than a first predetermined value when measured by a JIS-standard testing method (JIS K0552), thus obtaining the electrode catalyst precursor (II).

Figure 1:
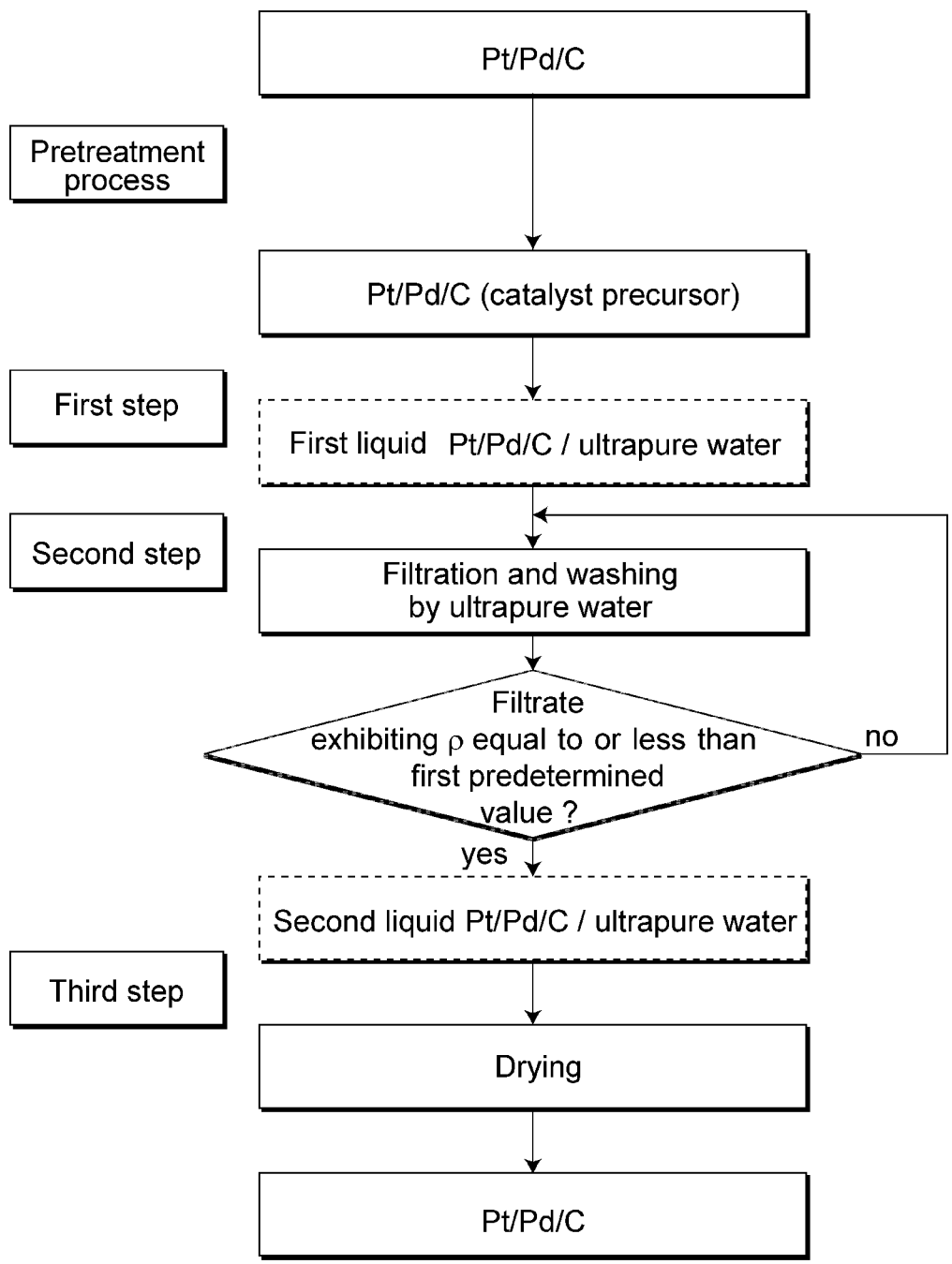
FIG. 1 is a flow chart showing a preferred embodiment of production steps of a production method of an electrode catalyst including the first to third steps according to the production method of an electrode catalyst of the present invention.

FIG. 1 is a flow chart showing each operation of a preferred embodiment of the production steps of the production method of the electrode catalyst, the production steps including a first step to a third step. In the first step, there is prepared the first liquid containing the electrode catalyst precursor (I). In the second step, the electrode catalyst precursor (I) contained in the first liquid is washed with the ultrapure water so as to prepare the second liquid containing the electrode catalyst precursor (II). Each of the steps is described below.

(First Step)

The production method of the electrode catalyst of the present invention includes the first step. In such first step, there is prepared the first liquid containing the ultrapure water and a given electrode catalyst precursor.

[Ultrapure Water]

The "ultrapure water" used in the first step of the production method of the electrode catalyst of the present invention is a type of water exhibiting a specific resistance R of not lower than 3.0 MΩ·cm, such specific resistance R being represented by the following general formula (1) (i.e. an inverse number of the electric conductivity measured by the JIS-standard testing method (JIS K0552)). Further, it is preferred that the "ultrapure water" have a water quality equivalent to or clearer than "A3" as defined in JISK 0557 "Water used for industrial water and wastewater analysis."

There are no particular restrictions on the abovementioned ultrapure water, as long as the water has an electric conductivity that satisfies the relationship represented by the general formula (1). Examples of such ultrapure water include ultrapure water produced using ultrapure water system from "Milli-Q series" (by Merck Ltd.); and ultrapure water produced using ultrapure water system from "Elix UV series" (by Nihon Millipore K.K.). Here, it is preferred that such ultrapure water be used in the first step, because impurities such as chlorine (Cl) species will thus not be contained in the electrode catalyst.

[Formula 1]

$$R = 1/\rho \qquad (1)$$

In the above general formula (1), R represents the specific resistance, and ρ represents the electric conductivity measured by the JIS-standard testing method (JIS K0552).

[Electrode Catalyst Precursor]

The electrode catalyst precursor (I) used in the first step satisfies the condition where the chlorine (Cl) species concentration measured by X-ray fluorescence (XRF) spectroscopy is not lower than a predetermined first chlorine (Cl) species concentration (e.g. 6,000 ppm). The chlorine (Cl) species contained in the electrode catalyst precursor (I) is derived from a catalyst component(s) as the raw material of the electrode catalyst and a treatment liquid(s).

As for an electrode catalyst obtained by a conventional production method of electrode catalyst using a material containing chlorine (Cl) species, unless subjected to the elimination of the chlorine (Cl) species, the chlorine (Cl) species concentration measured by X-ray fluorescence (XRF) spectroscopy is typically a relatively high concentration which is not lower than the first chlorine (Cl) species concentration (e.g. a first chlorine (Cl) species concentration of 6,000 ppm).

According to the studies conducted by the inventors of the present invention, the electrode catalyst (as the electrode catalyst precursor in the present invention) obtained by the conventional production method of electrode catalyst using a material containing chlorine (Cl) species, exhibited a chlorine (Cl) species concentration not lower than 6,000 ppm when measured by the abovementioned spectroscopy (see results of comparative examples below). That is, the electrode catalyst precursor used in the first step (I) is equivalent to the electrode catalyst obtained by the conventionally employed production method of electrode catalyst.

The electrode catalyst precursor of the electrode catalyst 1 is produced by having the support 2 support the catalyst components (core part 4, shell part 5) of the electrode catalyst. There are no particular restrictions on a production method of the electrode catalyst precursor as long as the method allows the catalyst components of the electrode catalyst 1 to be supported on the support 2.

Examples of the production method of the electrode catalyst precursor include an impregnation method where a solution containing the catalyst components of the electrode catalyst 1 is brought into contact with the support 2 to impregnate the support 2 with the catalyst components; a liquid phase reduction method where a reductant is put into a solution containing the catalyst components of the electrode catalyst 1; an electrochemical deposition method such as under-potential deposition (UPD); a chemical reduction method; a reductive deposition method using adsorption hydrogen; a surface leaching method of alloy catalyst; immersion plating; a displacement plating method; a sputtering method; and a vacuum evaporation method.

(Second Step)

The production method of the electrode catalyst of the present invention includes the second step. In the second step, the electrode catalyst precursor (I) contained in the first liquid is washed with the ultrapure water so as to prepare the second liquid containing the electrode catalyst precursor (II). The second step is to use the ultrapure water to filtrate and wash the electrode catalyst precursor (I) contained in the first liquid prepared in the first step. In the second step, by filtrating and washing the first liquid, the chlorine (Cl) species contained in the electrode catalyst precursor (I) is eliminated. As a result, the concentration of the chlorine (Cl) species of the electrode catalyst precursor (I) is greatly reduced.

In a second step, the ultrapure water used to wash the first liquid may be the same ultrapure water as that used in the first step. The electrode catalyst precursor (I) is washed until the electric conductivity $\rho$ of the filtrate obtained after washing has become the first predetermined value or lower.

The first predetermined value serves as a reference for the concentration the chlorine (Cl) species contained in the electrode catalyst precursor (I). By judging whether the electric conductivity $\rho$ of the filtrate obtained after performing washing is the first predetermined value or lower, it becomes possible to determine whether the concentration of the chlorine (Cl) species contained in the electrode catalyst precursor (I) has been able to be reduced.

In the second step, the electrode catalyst precursor (I) is repeatedly washed until there has been achieved a value that is equal to or lower than the first predetermined value. When the filtrate obtained after performing washing exhibits an electric conductivity $\rho$ not higher than the first predetermined value, most of the chlorine (Cl) species contained in the electrode catalyst precursor (I) is now eliminated. When the filtrate obtained after performing washing has exhibited an electric conductivity $\rho$ not higher than the first predetermined value, the washing of the electrode catalyst precursor (I) is completed. The concentration of the chlorine (Cl) species contained in the electrode catalyst precursor significantly decreases after washing is completed. In the second step, the electrode catalyst precursor obtained after completing washing is defined as the electrode catalyst precursor (II). The liquid with the electrode catalyst precursor (II) being dispersed in the ultrapure water becomes the second liquid. By drying the second liquid, there can be obtained the electrode catalyst precursor (II). The electrode catalyst precursor (II) thus obtained may be used as an electrode catalyst, or as an electrode catalyst precursor in a third step or the like following the second step.

Here, there are no particular restrictions on the method of performing filtration and washing in the second step, as long as the core-shell structure of the electrode catalyst of the present invention will not be impaired by the method employed. As such filtration and washing method, there may be performed, for example, a natural filtration or a filtration under a reduced pressure, using a paper filter or a membrane filter.

The first predetermined value can be appropriately determined depending on the concentration of the chlorine (Cl) species contained in the electrode catalyst. It is preferred that the first predetermined value be that selected from a range of not higher than 100 $\mu$S/cm. Further, it is more preferred that the first predetermined value be that selected from a range of not higher than 10 $\mu$S/cm. It is preferred when the first predetermined value is not higher than 100 $\mu$S/cm, because the concentration of the chlorine (Cl) species contained in the electrode catalyst precursor (II) can be easily reduced not only to a concentration of less than 6,000 ppm, but also to a concentration of not higher than 5,000 ppm, or even to a concentration level of 2,000 to 4,000 ppm.

(Pretreatment Process)

Figure 2:
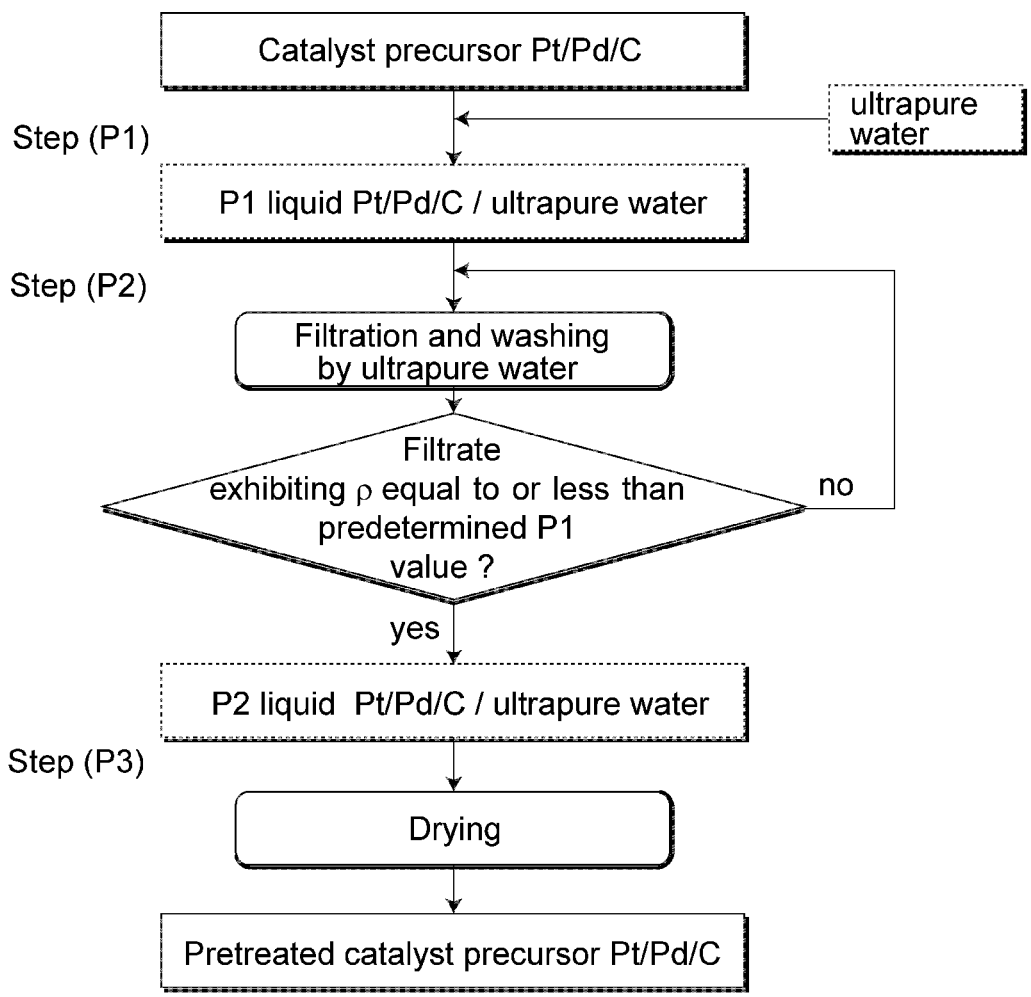
FIG. 2 is a flow chart showing a preferred embodiment of production steps of a production method of an electrode catalyst including a pretreatment process according to the production method of an electrode catalyst of the present invention.

In the production method of the electrode catalyst of the present invention, as such electrode catalyst precursor (I) used in the first step, there may also be used a type of electrode catalyst precursor (I) obtained through a "pretreatment process" including the following steps (P1) to (P3). FIG. 2 is a flow chart showing each operation of a preferred embodiment of the pretreatment process.

As shown in FIG. 2, the pretreatment process includes a step (P1), a step (P2) and a step (P3). The step (P1) is to prepare a P1 liquid with an electrode catalyst precursor (PI) being dispersed in ultrapure water. The P1 liquid is prepared by adding such electrode catalyst precursor (PI) to the ultrapure water. Here, the electrode catalyst precursor (PI) is produced using a material containing chlorine (Cl) species, and exhibits a relatively high chlorine (Cl) species concentration which is not lower than a predetermined second chlorine (Cl) species concentration (e.g. a predetermined second chlorine (Cl) species concentration of 6,000 ppm) when measured by X-ray fluorescence (XRF) spectroscopy.

The step (P2) is to prepare a P2 liquid by dispersing an electrode catalyst precursor (PII) in the ultrapure water. Specifically, the electrode catalyst precursor (PIT) is obtained as follows. That is, the electrode catalyst precursor (PI) contained in the P1 liquid is washed using the ultrapure water, followed by repeatedly washing the same until a filtrate obtained after washing has exhibited an electric conductivity $\rho$ that is not higher than a predetermined value of the step P1 when measured by the JIS-standard testing method (JIS K0552), thus obtaining the electrode catalyst precursor (PII).

The step (P3) is to dry the P2 liquid.

In the pretreatment process, the predetermined second chlorine (Cl) species concentration is typically set to be higher than the predetermined first chlorine (Cl) species concentration in the first step.

Thus, in the production method of the electrode catalyst of the present invention, the predetermined first chlorine (Cl) species concentration and the predetermined second chlorine (Cl) species concentration are previously determined in accordance with the concentration of the chlorine (Cl) species contained in the electrode catalyst precursor and with a production process.

The filtration and washing method used in the step P2 is similar to that used in the second step. It is preferred that the predetermined P1 value in the step P2 be that selected from the rang of not higher than 100 $\mu$S/cm, or even from the range of not higher than 10 $\mu$S/cm. Further, a drying method used in the step P3 is similar to a later-described drying method used in the third step.

Here, if the first step undergoes the pretreatment process, the first predetermined value is typically set to be either not higher than or lower than the predetermined value of the step P1 in the pretreatment process.

However, due to the abovementioned reslurry effect, when the amount of the chlorine (Cl) species to be eliminated through washing is increased, and the chlorine (Cl) species concentration becomes large in the first step (and the second step) rather than in the pretreatment process, the first predetermined value may be set to be higher than the predetermined P1 value in certain cases.

By subjecting the electrode catalyst precursor (PI) to the pretreatment process, the chlorine (Cl) species contained in the electrode catalyst precursor (PI) is eliminated. Further, the electrode catalyst precursor (PII) whose chlorine (Cl) species concentration has been reduced is defined as the electrode catalyst precursor (I) in the first step. Such electrode catalyst precursor (I) is then subjected to the first step. In the first step, the electrode catalyst precursor obtained through the steps (P1) to (P3) is used as a starting material to carry out each operation. Thus, in the production method of the electrode catalyst of the present invention, by establishing the pretreatment process before the first step, the concentration of the chlorine (Cl) species contained in the electrode catalyst precursor (I) can be further reduced.

In addition, as mentioned earlier, the dispersion liquid obtained through the step (P2) is once dried in the step (P3), followed by once again dispersing the same in the ultrapure water in the first step (so-called reslurrying), thereby making it possible to more reliably reduce the chlorine (Cl) species contained in the electrode catalyst precursor.

(Third Step)

The production method of the electrode catalyst of the present invention includes the third step. The third step is a step of drying the second liquid obtained after the second step. There are no particular restrictions on the conditions for drying the second liquid, as long as the conditions include a drying temperature and a drying time under which the electrode catalyst contained in the second liquid can be obtained. For example, such drying temperature may be 20 to 90° C., and such drying time may be 0.5 to 48.0 hours.

(Fourth Step)

Figure 3:
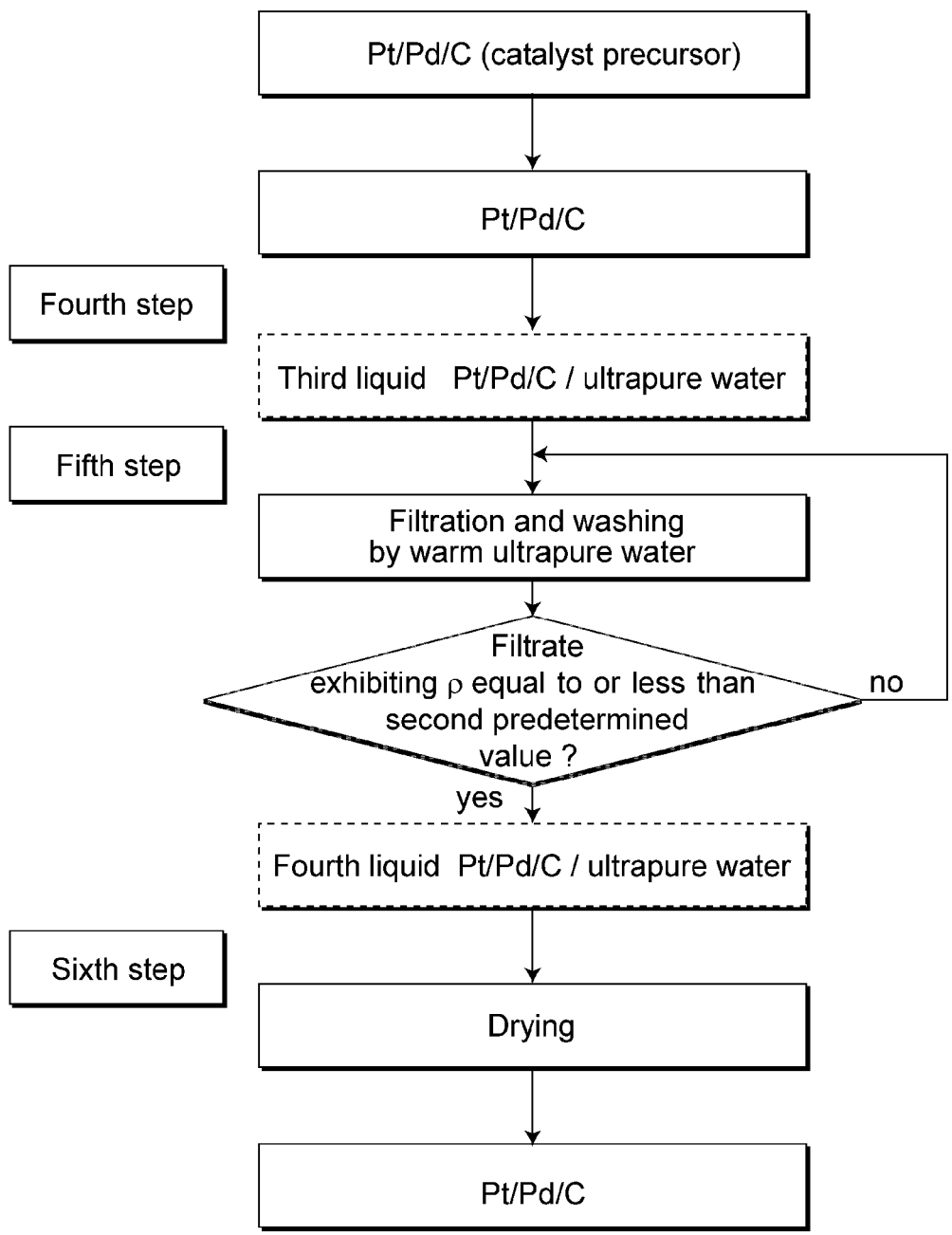
FIG. 3 is a flow chart showing a preferred embodiment of production steps of a production method of an electrode catalyst including the fourth to sixth steps according to the production method of an electrode catalyst of the present invention.

FIG. 3 is a flow chart showing a preferred embodiment of the production method of the electrode catalyst, the production method now including a fourth step to a sixth step. As shown in FIG. 3, the production method of the electrode catalyst of the present invention includes the fourth step. In the fourth step, the electrode catalyst obtained after the third step is considered as the electrode catalyst precursor (II). Further, in the fourth step, a third liquid is prepared by adding the electrode catalyst precursor (II) to ultrapure water. The chlorine (Cl) species contained in the electrode catalyst precursor (II) is eliminated when coming into contact with the ultrapure water. The concentration of the chlorine (Cl) species in the electrode catalyst precursor (II) will further decrease. The electrode catalyst precursor obtained by the fourth step is defined as an electrode catalyst precursor (III).

Also, as mentioned previously, the dispersion liquid obtained after the second step is once dried in the third step, followed by once again dispersing the same in the ultrapure water in the fourth step (so-called reslurrying), thereby making it possible to more reliably reduce the chlorine (Cl) species contained in the electrode catalyst precursor.

(Fifth Step)

The production method of the electrode catalyst of the present invention includes the fifth step. In the fifth step i.e. after the fourth step, an electrode catalyst (III) contained in the third liquid is filtrated and washed using ultrapure water of a temperature not lower than 60° C. and not higher than its boiling point. The chlorine (Cl) species contained in the electrode catalyst (III) is eliminated when coming into contact with the ultrapure water of the temperature not lower than 60° C. and not higher than its boiling point. In the fifth step, since used as ultrapure water is the ultrapure water of the temperature not lower than 60° C. and not higher than its boiling point, the chlorine (Cl) species contained in the electrode catalyst (III) can be eliminated more effectively.

Next, in the fifth step, the electrode catalyst precursor (III) is repeatedly washed until there has been achieved a value not higher than a second predetermined value. If the electric conductivity $\rho$ of the filtrate obtained after washing is equal to or less than the second predetermined value, most of the chlorine (Cl) species contained in the electrode catalyst precursor (III) is eliminated. When the electric conductivity $\rho$ of the filtrate obtained after washing has become equal to or less than the second predetermined value, washing of the electrode catalyst precursor (III) is completed. The concentration of the chlorine (Cl) species contained in the electrode catalyst precursor after completing washing, is greatly reduced. In the fifth step, the electrode catalyst precursor obtained after completing washing is defined as an electrode catalyst precursor (IV). A liquid with the electrode catalyst precursor (IV) being dispersed in ultrapure water becomes a fourth liquid.

The second predetermined value can be appropriately set depending on the concentration of the chlorine (Cl) species contained in the electrode catalyst. It is preferred that the second predetermined value be that selected from the range of not higher than 100 μS/cm. Moreover, it is more preferred that the second predetermined value be that selected from the range of not higher than 10 μS/cm. It is preferred when the second predetermined value is equal to or less than 100 μS/cm, because the concentration of the chlorine (Cl) species contained in the electrode catalyst precursor (IV) can be easily reduced not only to a concentration of less than 6,000 ppm, but also to a concentration of not higher than 5,000 ppm, or even to a concentration level of 2,000 to 4,000 ppm.

(Sixth Step)

The production method of the electrode catalyst of the present invention includes the sixth step. The sixth step is a step of obtaining the electrode catalyst precursor (IV) by drying the fourth liquid. The electrode catalyst precursor (IV) obtained is used as the electrode catalyst.

(Seventh Step)

Figure 4:
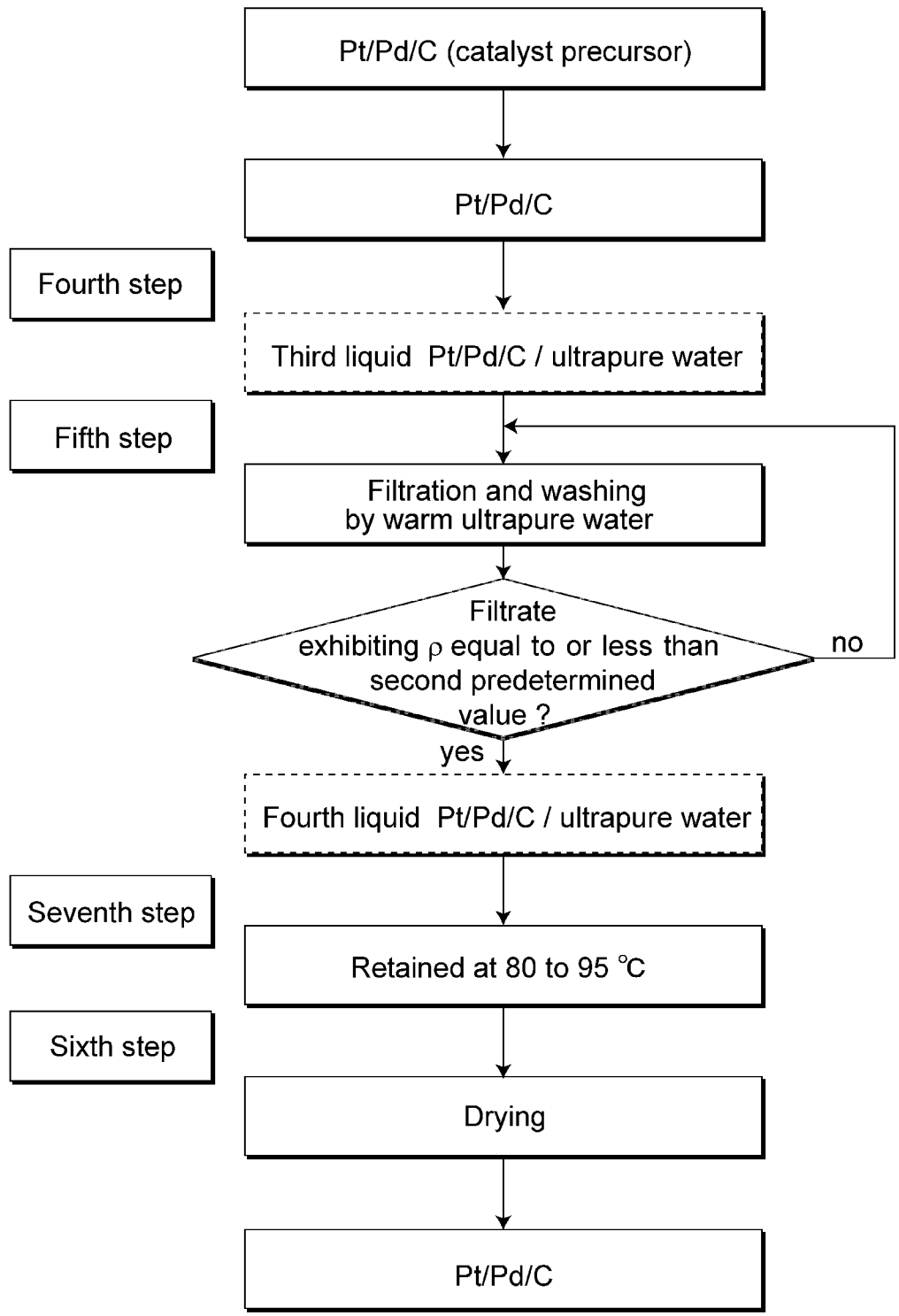
FIG. 4 is a flow chart showing a preferred embodiment of production steps of a production method of an electrode catalyst including the fourth to seventh steps according to the production method of an electrode catalyst of the present invention.
Figure 5:
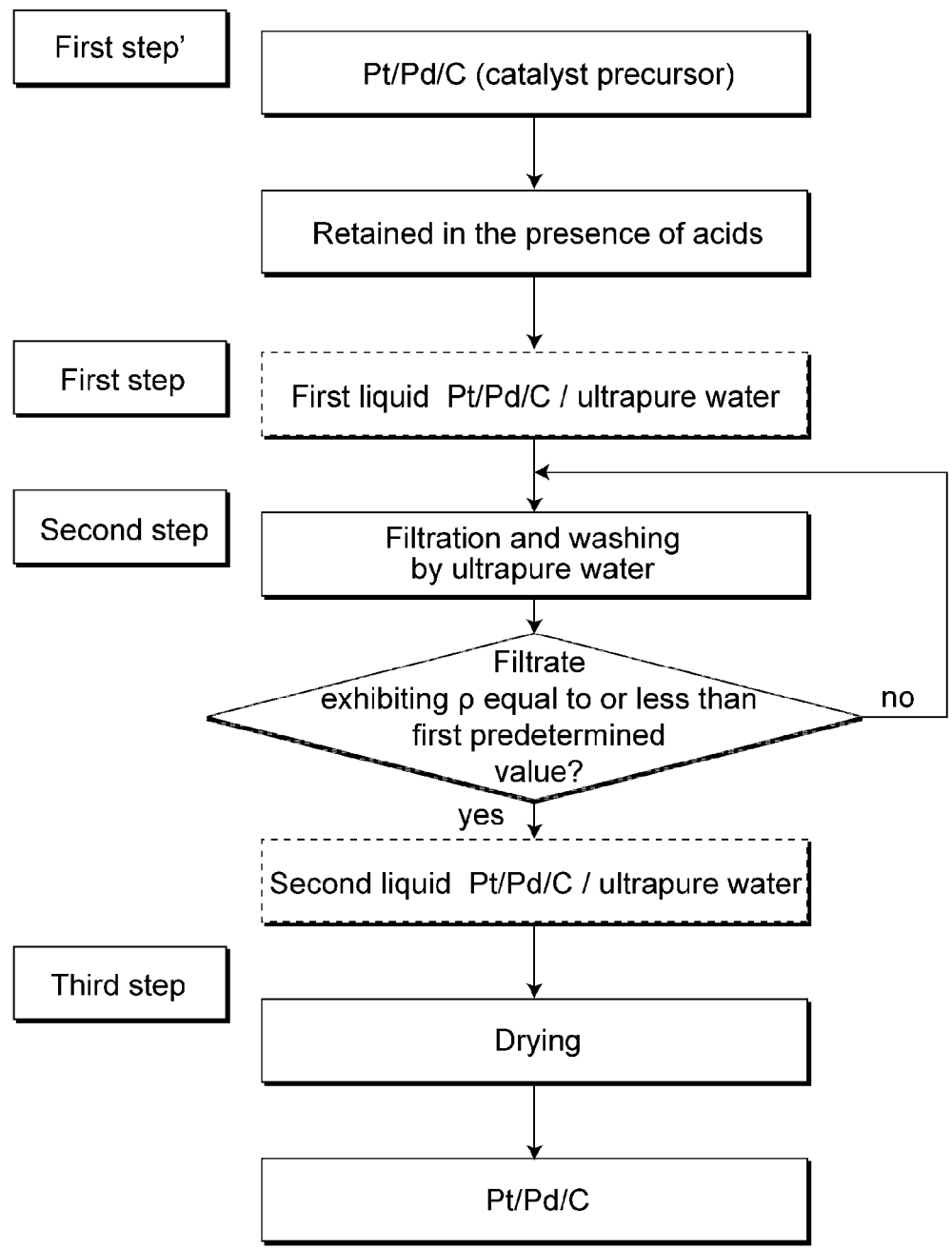
FIG. 5 is a flow chart showing a preferred embodiment of production steps of a production method of an electrode catalyst including the acid treatment according to the production method of an electrode catalyst of the present invention.

FIG. 4 is a flow chart showing a preferred embodiment of the production method of the electrode catalyst, including the fourth step to a seventh step. As shown in FIG. 4, the production method of the electrode catalyst of the present invention includes the seventh step. The seventh step is established between the fifth step and the sixth step, and includes a process of retaining the fourth liquid at a predetermined temperature for a predetermined time. The fourth liquid is retained under at least one stage of a predetermined temperature that is previously set within a range of 60° C. to boiling point (preferably 80 to 95° C.). The chlorine (Cl) species contained in the electrode catalyst precursor (IV) can be effectively eliminated by retaining the fourth liquid within the temperature range of 60° C. to boiling point (preferably 80 to 95° C.). With regard to the predetermined temperature, there may be set multiple stages of such predetermined temperature. By setting multiple stages of such predetermined temperature, there can be controlled the eliminated amount of the chlorine (Cl) species contained in the electrode catalyst precursor (IV).

Although there are no particular restrictions on the retention temperature so long as the retention temperature is within the range of 60° C. to boiling point (preferably 80 to 95° C.), the retention temperature is appropriately set depending on the concentration of the chlorine (Cl) species contained in the electrode catalyst precursor (IV); whether pretreatment was performed; and the number of times the filtration and washing was repeated using the ultrapure water.

There are no particular restrictions on the retention time so long as the retention time is that allowing the chlorine (Cl) species contained in the electrode catalyst precursor (IV) to be sufficiently eliminated in the fourth liquid when coming into contact with ultrapure water of the temperature of 60° C. to boiling point (preferably 80 to 95° C.).

In the seventh step, the chlorine (Cl) species contained in the electrode catalyst precursor (IV) is completely eliminated by retaining the fourth liquid at a given temperature and for a given time between the fifth step and the sixth step. Then, greatly reduced is the concentration of the chlorine (Cl) species in the electrode catalyst precursor that is measured by X-ray fluorescence (XRF) spectroscopy. The electrode catalyst obtained by the seventh step and the sixth step is defined as an electrode catalyst (V). The electrode catalyst precursor (V) becomes the electrode catalyst of the present invention when the abovementioned concentration of the chlorine (Cl) species has been finally and easily reduced not only to a concentration of less than 6,000 ppm, but also to a concentration of not higher than 5,000 ppm, or even to a concentration level of 2,000 to 4,000 ppm.

(First Step': Acid Treatment Step)

The production method of the electrode catalyst of the present invention includes a first step' which is an acid treatment step. The first step' is performed before the first step. In the first step', an electrode catalyst precursor ($I_0$) is used instead of the electrode catalyst precursor (I). A first liquid' is prepared by dispersing such electrode catalyst precursor ($I_0$) in an aqueous solution obtained by adding to ultrapure water at least one acid selected from the group consisting of a sulfuric acid and a nitric acid. In addition, the first liquid' is retained under at least one stage of a predetermined temperature that is previously set within a range of 10 to 95° C. (preferably 20 to 90° C.), and for a predetermined retention time.

Since an acid is added to the first liquid', the chlorine (Cl) species contained in the electrode catalyst precursor ($I_0$) will react with the protons present in the first liquid' such that the chlorine (Cl) species can be effectively eliminated. In addition, the first liquid' is retained at a temperature of a range of 20 to 90° C. Eliminated is the chlorine (Cl) species contained in the electrode catalyst precursor ($I_0$) present in the first liquid'. With regard to the predetermined temperature, there may be set multiple stages of such predetermined temperature. By setting multiple stages of such predetermined temperature, there can be controlled the eliminated amount of the chlorine (Cl) species contained in the electrode catalyst precursor ($I_0$).

There are no particular restrictions on the retention time so long as the retention time is that allowing the chlorine (Cl) species contained in the electrode catalyst precursor ($I_0$) to be sufficiently eliminated in the first liquid' when coming into contact with ultrapure water of the temperature of 10 to 95° C. (preferably 20 to 90° C.).

In the first step', the electrode catalyst precursor ($I_0$) contained in the first liquid' is considered as the electrode catalyst precursor (I) used in the first step. Such electrode catalyst precursor (I) is used the first step. In the first step, the electrode catalyst precursor (I) obtained through the first step' is used as a starting material to carry out each operation. Thus, in the production method of the electrode catalyst of the present invention, by establishing the acid treatment step before the first step, the concentration of the chlorine (Cl) species contained in the electrode catalyst precursor (I) can be further reduced.

In the first step', it is neither necessary to repeatedly wash the electrode catalyst precursor ($I_0$), nor necessary to measure the electric conductivity ρ of the filtrate obtained after performing filtration and washing. Therefore, in the production method of the electrode catalyst of the present invention, carrying out the first step' before the first step has a great significance in terms of technology.

Thus, according to the production method of the electrode catalyst of the present invention, it is possible to reduce the chlorine (Cl) species contained in the electrode catalyst precursor. The electrode catalyst obtained by the production method of the electrode catalyst of the present invention, can easily reduce the concentration of the chlorine (Cl) species, as measured by X-ray fluorescence (XRF) spectroscopy, not only to a concentration of less than 6,000 ppm, but also to a concentration of not higher than 5,000 ppm, or even to a concentration level of 2,000 to 4,000 ppm.

Since the electrode catalyst obtained by the production method of the electrode catalyst of the present invention, can easily reduce the concentration of the chlorine (Cl) species, as measured by X-ray fluorescence (XRF) spectroscopy, not only to a concentration of less than 6,000 ppm, but also to a concentration of not higher than 5,000 ppm, or even preferably to a concentration level of 2,000 to 4,000 ppm, there can be fully exhibited the catalytic activity as that required for an electrode catalyst such that the problem of the corrosion of a catalyst layer can be avoided.

Here, Table 1 summarizes the steps included in the production method of the electrode catalyst of the present invention; the electrode catalyst precursors contained in the liquids (ultrapure water+electrode catalyst precursor) obtained in the steps; and the electrode catalysts as final products.

TABLE 1

| Production step | Electrode catalyst precursor | Liquids (ultrapure water + electrode catalyst precursor) | Electrode catalyst (precursor) |
|---|---|---|---|
| Step (1) → Step (2) → Step (3) | (I) → (II) | First → Second | (II) |
| Step (l) → Step (2) → Step (4) | (II) → (III) | Second → Third | (III) |
| Step (4) → Step (5) → Step (6) | (III) → (IV) | Third → Fourth | (IV) |
| Step (5) → Step (7) → Step (6) | (IV) → (V) | Fourth → Fourth | (V) |
| Pretreatment Step (P1) → Step (P2) → Step (P3) | (PI) → (PII) | P1 → P2 | (PII) → (I) |
| Acid treatment Step (1') → Step (1) | ($I_0$) → (I) | First' → First | (I) |

<Electrode Catalyst>

Figure 6:
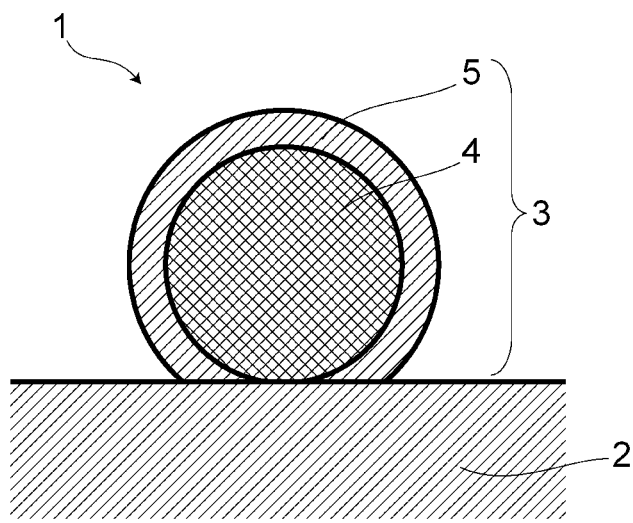
FIG. 6 is a schematic sectional view showing a preferred embodiment of the electrode catalyst of the present invention (core-shell catalyst).

FIG. 6 is a schematic cross-sectional view showing a preferable embodiment of an electrode catalyst 1 (core-shell catalyst) obtained by the electrode catalyst production method of the present invention.

As shown in FIG. 6, an electrode catalyst 1 obtained by the electrode catalyst production method of the present invention includes a support 2; and catalyst particles 3 supported on the support 2 and having a so-called "core-shell structure." Each catalyst particle 3 has a core part 4; and a shell part 5 covering at least a part of the surface of the core part 4. The catalyst particles 3 thus have a so-called "core-shell structure" including the core part 4 and the shell part 5 formed on the core part 4.

That is, the electrode catalyst 1 has the catalyst particles 3 supported on the support 2, and the catalyst particles 3 have the structure where the core part 4 serves as a core (core portion), and the shell part 5 as a shell covers the surface of the core part 4.

Further, the constituent element (chemical composition) of the core part 4 and the constituent element (chemical composition) of the shell part 5 differ from each other in composition.

There are no particular restrictions on the electrode catalyst 1 of the present invention except that the shell part 5 has to be formed on at least a part of the surface of the core part 4 of each catalyst particle 3.

For example, in terms of more reliably achieving the effects of the present invention, it is preferred that the electrode catalyst 1 be in a state where the whole range of the surface of the core part 4 is substantially covered by the shell part 5, as shown in FIG. 6.

Further, the electrode catalyst 1 may also be in a state where a part of the surface of the core part 4 is covered by the shell part 5, and the rest part of the surface of the core part 4 is thus partially exposed, provided that the effects of the present invention can be achieved.

That is, with regard to the electrode catalyst of the present invention, it is sufficient that the shell part be formed on at least a part of the surface of the core part.

Figure 7:
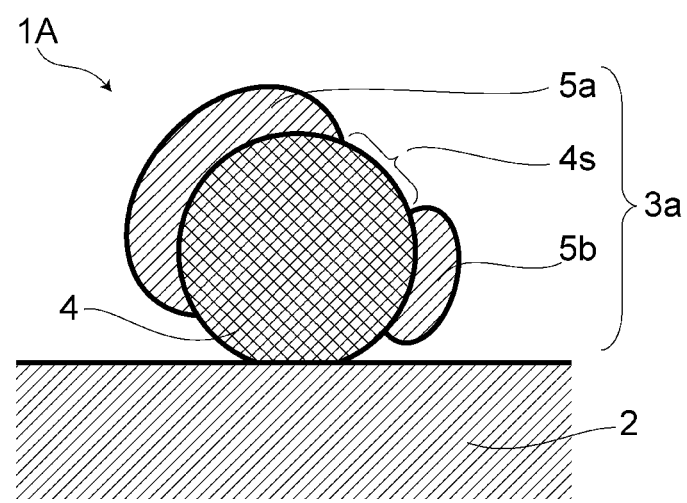
FIG. 7 is a schematic sectional view showing another preferred embodiment of the electrode catalyst of the present invention (core-shell catalyst).

FIG. 7 is a schematic cross-sectional view showing another preferable embodiment (electrode catalyst 1A) of the electrode catalyst (core-shell catalyst) of the present invention. As shown in FIG. 7, an electrode catalyst 1A of the present invention has catalyst particles 3a each being composed of a core part 4; a shell part 5a covering a part of the surface of the core part 4; and a shell part 5b covering another part of the surface of the core part 4.

With regard to the catalyst particles 3a contained in the electrode catalyst 1A shown in FIG. 7, there is a part of the core part 4 that is neither covered by the shell part 5a nor covered by the shell part 5b. This part of the core part 4 composes a core part-exposed surface 4s.

That is, as shown in FIG. 7, the catalyst particles 3a contained in the electrode catalyst 1A may also be in a state where the surface of the core part 4 is partially exposed (e.g. a state where 4s as a part of the surface of the core part 4 shown in FIG. 7 is exposed).

In other words, as is the case with the electrode catalyst 1A shown in FIG. 7, the shell part 5a may be partially formed on a part of the surface of the core part 4, and the shell part 5b may then be partially formed on another part of the surface of the core part 4.

Figure 8:
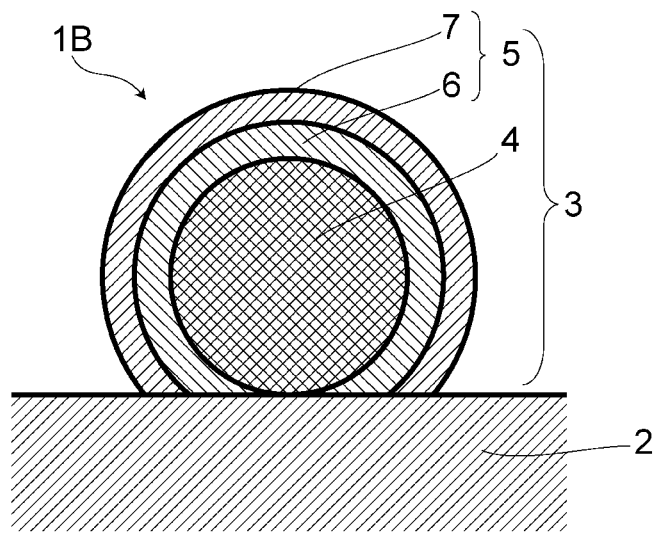
FIG. 8 is a schematic sectional view showing another preferred embodiment of the electrode catalyst of the present invention (core-shell catalyst).

FIG. 8 is a schematic cross-sectional view showing another preferable embodiment (electrode catalyst 1B) of the electrode catalyst (core-shell catalyst) of the present invention.

As shown in FIG. 8, an electrode catalyst 1B of the present invention has catalyst particles 3 each being composed of a core part 4; and a shell part 5 substantially covering the whole range of the surface of the core part 4.

The shell part 5 may have a two-layered structure composed of a first shell part 6 and a second shell part 7. That is, the catalyst particles 3 have a so-called "core-shell structure" comprised of the core part 4; and the shell part 5 (first shell part 6 and second shell part 7) formed on the core part 4.

The electrode catalyst 1B has a structure where the catalyst particles 3 are supported on the support 2; the core part 4 of each catalyst particle 3 serves as a core (core portion); and the whole range of the surface of the core part 4 is substantially covered by the shell part 5 composed of the first shell part 6 and the second shell part 7.

Here, the constituent element (chemical composition) of the core part 4, the constituent element (chemical composition) of the first shell part 6 and the constituent element (chemical composition) of the second shell part 7 differ from one another in composition.

Moreover, the shell part 5 included in the electrode catalyst 1B of the present invention may further include another shell part in addition to the first shell part 6 and the second shell part 7.

In terms of more reliably achieving the effects of the present invention, it is preferred that the electrode catalyst 1B be in a state where the whole range of the surface of the core part 4 is substantially covered by the shell part 5, as shown in FIG. 8.

Figure 9:
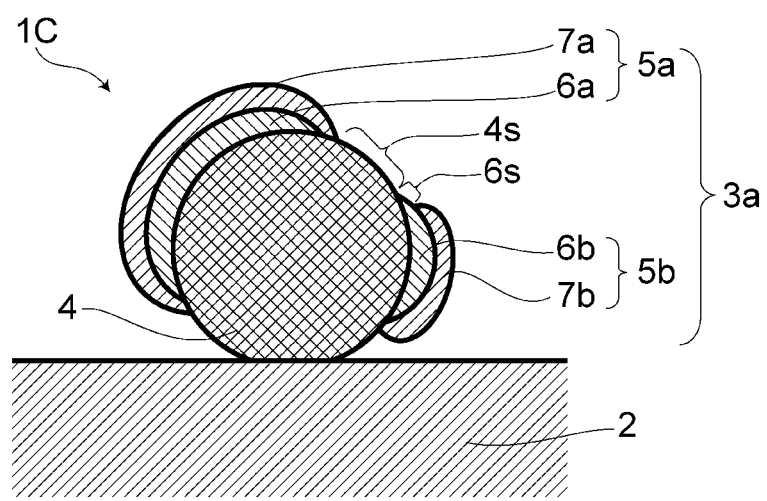
FIG. 9 is a schematic sectional view showing another preferred embodiment of the electrode catalyst of the present invention (core-shell catalyst).

FIG. 9 is a schematic cross-sectional view showing another preferable embodiment (electrode catalyst 1C) of the electrode catalyst (core-shell catalyst) of the present invention.

As shown in FIG. 9, an electrode catalyst 1C of the present invention has catalyst particles 3a each being composed of a core part 4; a shell part 5a covering a part of the surface of the core part 4; and a shell part 5b covering another part of the surface of the core part 4.

The shell part 5a may have a two-layered structure composed of a first shell part 6a and a second shell part 7a.

Further, the shell part 5b may have a two-layered structure composed of a first shell part 6b and a second shell part 7b.

That is, the catalyst particles 3a have a so-called "core-shell structure" comprised of the core part 4; the shell part 5a (first shell part 6a and second shell part 7a) formed on the core part 4; and the shell part 5b (first shell part 6b and second shell part 7b) formed on the core part 4.

With regard to the shell part 5b composing the catalyst particle 3a shown in FIG. 9, there is a part of the first shell part 6b that is not covered by the second shell part 7b. The part of the first shell part 6b that is not covered by the second shell part 7b composes a first shell part-exposed surface 6s.

With regard to the shell part 5a composing the catalyst particle 3 shown in FIG. 9, it is preferred that the whole range of the first shell part 6a be substantially covered by the second shell part 7a.

Further, as shown in FIG. 9 and with regard to the shell part 5b composing each catalyst particle 3a, also permissible is a state where a part of the surface of the first shell part 6b is covered, and the surface of the first shell part 6b is thus partially exposed (e.g. a state shown in FIG. 9 where the part 6s of the surface of the first shell part 6b is exposed), provided that the effects of the present invention can be achieved.

Moreover, on the premise that the effects of the present invention can be achieved, the electrode catalyst 1 may allow a "complex of the core part 4 and shell part 5 with the whole range of the surface of the core part 4 being substantially covered by the shell part 5" and a "complex of the core part 4 and shell part 5 with the surface of the core part 4 being partially covered by the shell part 5" to coexist on the support 2 in a mixed manner.

Specifically, the electrode catalyst of the present invention may be in a state where the electrode catalysts 1 and 1A shown in FIGS. 6 and 7 and the electrode catalysts 1B and 1C shown in FIGS. 8 and 9 coexist in a mixed manner, provided the effects of the present invention can be achieved.

Further, the electrode catalyst of the present invention may allow the shell part 5a and the shell part 5b to coexist in a mixed manner with respect to an identical core part 4, as shown in FIG. 9, provided that the effects of the present invention can be achieved.

Furthermore, on the premise that the effects of the present invention can be achieved, the electrode catalyst of the present invention may allow only the shell part 5a to exist with respect to an identical core part 4 or only the shell part 5b to exist with respect to an identical core part 4 (none of these states are shown in the drawings).

Furthermore, on the premise that the effects of the present invention can be achieved, the electrode catalyst of the present invention may also be in a state where "particles only comprised of the core parts 4 that are not covered by the shell parts 5" are supported on the support 2, in addition to at least one kind of the electrode catalysts 1, 1A, 1B and 1C (not shown).

Furthermore, on the premise that the effects of the present invention can be achieved, the electrode catalyst of the present invention may also be in a state where "particles only composed of the constituent element of the shell part 5" are supported on the support 2 without being in contact with the core parts 4, in addition to at least one kind of the electrode catalysts 1, 1A, 1B and 1C (not shown).

Furthermore, on the premise that the effects of the present invention can be achieved, the electrode catalyst of the present invention may also be in a state where "particles only comprised of the core parts 4 that are not covered by the shell parts 5" and "particles only composed of the constituent element of the shell part 5" are individually and independently supported on the support 2, in addition to at least one kind of the electrode catalysts 1, 1A, 1B and 1C.

It is preferred that the core part 4 have an average particle diameter of 2 to 40 nm, more preferably 4 to 20 nm, particularly preferably 5 to 15 nm.

As for the thickness of the shell part 5 (thickness from the surface in contact with the core part 4 to the outer surface of the shell part 5), a preferable range thereof is to be appropriately determined based on the design concept(s) of the electrode catalyst.

For example, when the amount of the metal element (e.g. platinum) used to compose the shell part 5 is intended to be minimized. When there is only one kind of metal element composing the shell part 5, it is preferred that the thickness of the shell part 5 be twice as large as the diameter of one atom of such metal element (in spherical approximation). Further, when there are not fewer than two kinds of metal elements composing the shell part 5, it is preferred that the thickness of the shell part 5 be that of a layer of one atom (one atomic layer formed with two or more kinds of atoms being apposed on the surface of the core part 4).

Further, for example, when attempting to improve a durability by employing a shell part 5 of a larger thickness, it is preferred that such thickness be 1 to 10 nm, more preferably 2 to 5 nm.

When the shell part 5 has the two-layered structure composed of the first shell part 6 and the second shell part 7, preferable ranges of the thicknesses of the first shell part 6 and second shell part 7 are appropriately determined based on the design concept(s) of the electrode catalyst of the present invention.

For example, when the amount of a noble metal such as platinum (Pt) as a metal element contained in the second shell part 7 is intended to be minimized, it is preferred that the second shell part 7 be a layer composed of one atom (one atomic layer). In this case, when there is only one kind of metal element composing the second shell part 7, it is preferred that the thickness of the second shell part 7 be approximately twice as large as the diameter of one atom of such metal element (provided that an atom is considered as a sphere).

Further, when there are not fewer than two kinds of metal elements contained in the second shell part 7, it is preferred that the second shell part 7 have a thickness equivalent to that of a layer composed of not fewer than one kind of atom (one atomic layer formed with two or more kinds of atoms being apposed in the surface direction of the core part 4). For example, when attempting to improve the durability of the electrode catalyst by employing a second shell part 7 of a larger thickness, it is preferred that the thickness of the second shell part 7 be 1.0 to 5.0 nm. If the durability of the electrode catalyst is to be further improved, it is preferred that the thickness of the second shell part 7 be 2.0 to 10.0 nm.

Here, in the present invention, "average particle diameter" refers to an average value of the diameters of an arbitrary number of particles as particle groups that are observed through electron micrographs.

There are no particular restrictions on the support 2, as long as such support 2 is capable of supporting the catalyst particles 3 as the complexes composed of the core parts 4 and the shell parts 5 serving as catalyst components of the electrode catalyst 1, and has a large surface area.

Moreover, it is preferred that the support 2 be that exhibiting a favorable dispersibility and a superior electrical conductivity in a composition used to form a gas diffusion electrode having the electrode catalyst 1.

The support 2 may be appropriately selected from carbon-based materials such as glassy carbon (GC), fine carbon, carbon black, black lead, carbon fiber, activated carbon, ground product of activated carbon, carbon nanofiber and carbon nanotube; and glass-based or ceramic-based materials such as oxides.

Among these materials, carbon-based materials are preferred in terms of their adsorptivities with respect to the core part 4 and in terms of a BET specific surface area of the support 2.

Further, as a carbon-based material, an electrically conductive carbon is preferred. Particularly, an electrically conductive carbon black is preferred as an electrically conductive carbon. Examples of such electrically conductive carbon black include products by the names of "Ketjenblack EC300 J," "Ketjenblack EC600" and "Carbon EPC" (produced by Lion Corporation).

There are no particular restrictions on the component of the core part 4, as long as the component is capable of being covered by the shell part 5.

When the shell part 5 employs a one-layered structure as are the cases with the electrode catalysts 1 and 1A that are shown in FIGS. 6 and 7 instead of the two-layered structure, the core part 4 may also employ a noble metal(s). The core part 4 composing the catalyst particles 3 and 3a of the electrode catalysts 1 and 1A, contains at least one metal selected from the group consisting of palladium (Pd), a palladium (Pd) alloy, a platinum (Pt) alloy, gold (Au), nickel (Ni) and a nickel (Ni) alloy.

There are no particular restrictions on a palladium (Pd) alloy, as long as the alloy is to be obtained by combining palladium (Pd) with another metal capable of forming an alloy when combined with palladium (Pd). For example, such palladium (Pd) alloy may be a two-component palladium (Pd) alloy obtained by combining palladium (Pd) with another metal; or a three or more-component palladium (Pd) alloy obtained by combining palladium (Pd) with not fewer than two kinds of other metals. Specifically, examples of such two-component palladium (Pd) alloy include gold palladium (PdAu), silver palladium (PdAg) and copper palladium (PdCu). One example of a three-component palladium (Pd) alloy is gold-silver-palladium (PdAuAg).

There are no particular restrictions on a platinum (Pt) alloy, as long as the alloy is to be obtained by combining platinum (Pt) with another metal capable of forming an alloy when combined with platinum (Pt). For example, such platinum (Pt) alloy may be a two-component platinum (Pt) alloy obtained by combining platinum (Pt) with another metal; or a three or more-component platinum (Pt) alloy obtained by combining platinum (Pt) with not fewer than two kinds of other metals. Specifically, examples of such two-component platinum (Pt) alloy include nickel platinum (PtNi) and cobalt platinum (PtCo).

There are no particular restrictions on a nickel (Ni) alloy, as long as the alloy is to be obtained by combining nickel (Ni) with another metal capable of forming an alloy when combined with nickel (Ni). For example, such nickel (Ni) alloy may be a two-component nickel (Ni) alloy obtained by combining nickel (Ni) with another metal; or a three or more-component nickel (Ni) alloy obtained by combining nickel (Ni) with not fewer than two kinds of other metals. Specifically, one example of such two-component nickel (Ni) alloy is tungsten nickel (NiW).

The shell part 5 contains at least one kind of metal selected from platinum (Pt) and a platinum (Pt) alloy. There are no particular restrictions on a platinum (Pt) alloy, as long as the alloy is to be obtained by combining platinum (Pt) with another metal capable of forming an alloy when combined with platinum (Pt). For example, such platinum (Pt) alloy may be a two-component platinum (Pt) alloy obtained by combining platinum (Pt) with another metal; or a three or more-component platinum (Pt) alloy obtained by combining platinum (Pt) with not fewer than two kinds of other metals. Specifically, examples of such two-component platinum (Pt) alloy include nickel platinum (PtNi), cobalt platinum (PtCo), platinum ruthenium (PtRu), platinum molybdenum (PtMo) and platinum titanium (PtTi). Particularly, in order for the shell part 5 to have a poisoning resistance, a platinum ruthenium (PtRu) alloy may be used.

As are the cases with the electrode catalysts 1B and 1C that are shown in FIGS. 8 and 9, when the shell part 5 employs the two-layered structure composed of the first shell part 6 and the second shell part 7, a metal element(s) other than noble metals may be the main component especially from the perspective of reducing the cost for producing the electrode catalyst 1. Specifically, it is preferred that the core part 4 be composed of a metal element(s) other than platinum (Pt) and palladium (Pd), a metal compound of such metal and/or a mixture of such metal and such metal compound. It is more preferred that the core part 4 be composed of a metal element(s) other noble metals, a metal compound of such metal and/or a mixture of such metal and such metal compound.

A supported amount of the platinum (Pt) contained in the shell part 5 is 5 to 20% by mass, preferably 8 to 16% by mass with respect to the weight of the electrode catalyst 1. It is preferred that the amount of the platinum (Pt) supported be not smaller than 5% by mass, because the electrode catalyst can fully exert its catalytic activity in such case. It is also preferred that the amount of the platinum (Pt) supported be not larger than 20% by mass in terms of production cost.

In the case where the shell part 5 has the two-layered structure composed of the first shell part 6 and the second shell part 7, it is preferred that the first shell part 6 contain at least one kind of metal selected from the group consisting of palladium (Pd), a palladium (Pd) alloy, a platinum (Pt) alloy, gold (Au), nickel (Ni) and a nickel (Ni) alloy, and it is more preferred that the first shell part 6 contain palladium (Pd) simple substance.

From the perspective of further improving the catalytic activities of the electrode catalysts 1B and 1C and more easily obtaining the same, it is preferred that the first shell part 6 be mainly composed of palladium (Pd) simple substance (not less than 50 wt %), and it is more preferred that such first shell part 6 be only composed of palladium (Pd) simple substance.

It is preferred that the second shell part 7 contain at least one kind of metal selected from platinum (Pt) and a platinum (Pt) alloy, and it is more preferred that such shell part 7 contain platinum (Pt) simple substance.

From the perspective of further improving the catalytic activities of the electrode catalysts 1B and 1C and more easily obtaining the same, it is preferred that the second shell part 7 be mainly composed of platinum (Pt) simple substance (not less than 50 wt %), and it is more preferred that such second shell part 7 be only composed of platinum (Pt) simple substance.

(Concentration of Chlorine (Cl) Species)

The electrode catalyst obtained by the electrode catalyst production method of the present invention has a technical feature of reducing the chlorine (Cl) species concentration by undergoing at least a first step (1) and a second step (2) of the production method of the electrode catalyst, even when employing an electrode catalyst precursor exhibiting a chlorine (Cl) species concentration of not lower than 6,000 ppm when measured through X-ray fluorescence (XRF) spectroscopy.

According to the production method of the electrode catalyst of the present invention, when using, as the raw material, an electrode catalyst precursor exhibiting a chlorine (Cl) species concentration of not lower than 6,000 ppm when measured by X-ray fluorescence (XRF) spectroscopy, there can be more easily provided than before an electrode catalyst whose chlorine (Cl) species concentration has been reduced not only to a concentration of not higher than 5,000 ppm, but also to a concentration level of 2,000 to 4,000 ppm.

The chlorine (Cl) species concentration is measured through X-ray fluorescence (XRF) spectroscopy. A value obtained by measuring the b chlorine (Cl) species contained in the electrode catalyst through X-ray fluorescence (XRF) spectroscopy is the chlorine (Cl) species concentration. Here, the chlorine (Cl) species concentration is the concentrations of the chlorine atoms in terms of the chlorine element contained in the electrode catalyst.

X-ray fluorescence (XRF) spectroscopy is a method where a specimen containing a particular element A is irradiated with a primary X-ray to generate a fluorescent X-ray of such element A, followed by measuring the intensity of such fluorescent X-ray of the element A such that quantitative analysis of the captioned element A contained in the specimen can be performed. When performing quantitative analysis through X-ray fluorescence (XRF) spectroscopy, there may be employed the fundamental parameter method (FP method) used in theoretical operation.

The FP method applies the idea that if the compositions and kinds of the elements contained in a specimen are all known, the fluorescent X-ray (XRF) intensities thereof can be individually and theoretically calculated. In addition, the FP method allows there to be estimated a composition(s) corresponding to the fluorescent X-ray (XRF) of each element that is obtained by measuring the specimen.

X-ray fluorescence (XRF) spectroscopy is performed using general fluorescent X-ray (XRF) analyzers such as an energy dispersive fluorescent X-ray (XRF) analyzer, a scanning-type fluorescent X-ray (XRF) analyzer and a multi-element simultaneous-type fluorescent X-ray (XRF) analyzer. A fluorescent X-ray (XRF) analyzer is equipped with a software which makes it possible to process the experimental data regarding the correlation between the intensity of the fluorescent X-ray (XRF) of the element A and the concentration of the element A.

There are no particular restrictions on such software, as long as the software is that generally used to perform X-ray fluorescence (XRF) spectroscopy.

For example, there may be employed a software for use in a general fluorescent X-ray (XRF) analyzer adopting the FP method, such as an analysis software: "UniQuant 5." Here, one example of the abovementioned fluorescent X-ray (XRF) analyzer is a full-automatic wavelength dispersive fluorescent X-ray analyzer (product name: Axios by Spectris Co., Ltd.)

As for the electrode catalyst obtained by the production method of the electrode catalyst of the present invention, the concentration of the chlorine (Cl) species, as measured by X-ray fluorescence (XRF) spectroscopy, is reduced not only to a concentration of less than 6,000 ppm, but also preferably to a concentration of not higher than 5,000 ppm, or even more preferably to a concentration level of 2,000 to 4,000 ppm (provided that the electrode catalyst precursor used has a (Cl) species concentration of not lower than 6,000 ppm). It is preferred when the chlorine (Cl) species concentration is 4000 ppm or less, because there can be easily exhibited a sufficient catalytic activity as an electrode catalyst, and the catalyst layer will not corrode such that a battery life will not be shortened.

Further, as for the production method of the electrode catalyst of the present invention, by undergoing the pretreatment process, there can be used, as a raw material of the electrode catalyst, a type of electrode catalyst precursor exhibiting a further reduced chlorine (Cl) species concentration.

Here, as for the production method of the electrode catalyst of the present invention, as a raw material of the electrode catalyst, there can even be used an electrode catalyst precursor exhibiting a chlorine (Cl) species concentration of lower than 6,000 ppm. It is preferred that an electrode catalyst precursor with a further reduced chlorine (Cl) species concentration be used, because there can be reduced the number of operations for eliminating chlorine (Cl) species and the amount of ultrapure water used for such purpose.

(X-Ray Fluorescence (XRF) Spectroscopy)

The X-ray fluorescence (XRF) spectroscopy is, for example, performed in the following manner.

(1) Measurement Device

Full-automatic wavelength dispersive fluorescent X-ray analyzer Axios (by Spectris Co., Ltd.)

(2) Measurement Condition

Analysis software: "UniQuant 5" (Semi-quantitative analysis software employing FP (four peak method))

XRF measurement chamber atmosphere: Helium (normal pressure)

(3) Measurement Procedure (i) Placing a sample-containing sample container into an XRF sample chamber (ii) Replacing an atmosphere in the XRF sample chamber with helium gas (iii) Setting the measurement condition to "UQ5 application" as a condition required to use the analysis software "UniQuant 5" and configuring a mode where calculation is performed in a mode with the main component of the sample being "carbon (constituent element of support)" and with a sample analysis result-display format being "element," under a helium gas atmosphere (normal pressure)

<Structure of Fuel Cell Stack>

Figure 10:
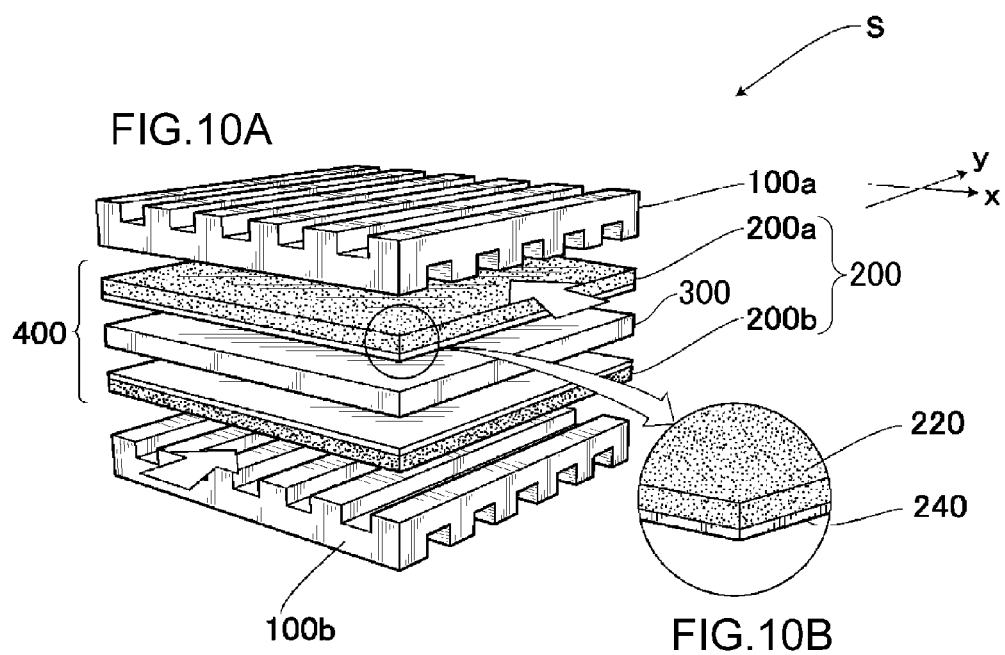
FIG. 10 is a schematic diagram showing a preferred embodiment of a fuel cell stack of the present invention.

FIG. 10 is a schematic view showing preferable embodiments of a composition for forming gas diffusion electrode containing the electrode catalyst of the present invention; a gas diffusion electrode produced using such composition for forming gas diffusion electrode; a membrane-electrode assembly (MEA) having such gas diffusion electrode; and a fuel cell stack having such membrane-electrode assembly (MEA).

As for a fuel cell stack S shown in FIG. 10, each membrane-electrode assembly (MEA) 400 serves as a one-unit cell, and the fuel cell stack S is configured by stacking multiple layers of such one-unit cells.

Particularly, the fuel cell stack S has a membrane-electrode assembly (MEA) 400 that is equipped with an anode 200*a*, a cathode 200*b* and an electrolyte membrane 300 provided between these electrodes.

More particularly, the fuel cell stack S has a structure where the membrane-electrode assembly (MEA) is sandwiched between a separator 100*a* and a separator 100*b*.

Described hereunder are the composition for forming gas diffusion electrode, a gas diffusion electrode 200*a*, a gas diffusion electrode 200*b* and the membrane-electrode assembly (MEA) 400, all of which serve as members of the fuel cell stack S containing the electrode catalyst of the present invention.

<Composition for Forming Gas Diffusion Electrode>

The electrode catalyst 1 can be used as a so-called catalyst ink component and serve as the composition for forming gas diffusion electrode in the present invention. One feature of the composition for forming gas diffusion electrode in the present invention is that this composition contains the aforementioned electrode catalyst. The main components of the composition for forming gas diffusion electrode are the abovementioned electrode catalyst and an ionomer solution. The ionomer solution contains water, an alcohol and a polyelectrolyte exhibiting a hydrogen ion conductivity.

A mixing ratio between water and an alcohol in the ionomer solution can be any ratio, as long as it is the kind of ratio capable of endowing a viscosity suitable for applying to the electrode the composition for forming gas diffusion electrode. In general, it is preferred that an alcohol be contained in an amount of 0.1 to 50.0 parts by weight with respect to 100 parts by weight of water. Further, it is preferred that the alcohol contained in the ionomer solution be a monohydric alcohol or a polyhydric alcohol. Examples of a monohydric alcohol include methanol, ethanol, propanol and butanol. Examples of a polyhydric alcohol include dihydric alcohols or trihydric alcohols. As a dihydric alcohol, there can be listed, for example, ethylene glycol, diethylene glycol, tetraethylene glycol, propylene glycol, 1,3-butanediol and 1,4-butanediol. As a trihydric alcohol, there may be used glycerin, for example. Further, the alcohol contained in the ionomer solution may be either one kind of alcohol or a combination of two or more kinds of alcohols. Here, the ionomer solution may also be appropriately allowed to contain an additive(s) such as a surfactant, if necessary.

For the purpose of dispersing the electrode catalyst, the ionomer solution contains a hydrogen ion-conductive polyelectrolyte as a binder component for improving an adhesion to a gas diffusion layer as a part composing the gas diffusion electrode. Although there are no particular restrictions on the polyelectrolyte, examples of such polyelectrolyte include known perfluorocarbon resins having sulfonate groups and/or carboxylic acid groups. As an easily obtainable hydrogen ion-conductive polyelectrolyte, there can be listed, for example, Nafion (registered trademark of Du Pont), ACIPLEX (registered trademark of Asahi Kasei Chemical Corporation) and Flemion (registered trademark of ASAHI GLASS Co., Ltd).

The composition for forming gas diffusion electrode can be produced by mixing, crushing and stirring the electrode catalyst and the ionomer solution. The composition for forming gas diffusion electrode may be prepared using crushing and mixing machines such as a ball mill and/or an ultrasonic disperser. A crushing and a stirring conditions at the time of operating a crushing and mixing machine can be appropriately determined in accordance with the mode of the composition for forming gas diffusion electrode.

It is required that the composition of each of the electrode catalyst, water, alcohol(s) and hydrogen ion-conductive polyelectrolyte that are contained in the composition for forming gas diffusion electrode be that capable of achieving a favorable dispersion state of the electrode catalyst, allowing the electrode catalyst to be distributed throughout an entire catalyst layer of the gas diffusion electrode and improving the power generation performance of the fuel cell.

Particularly, it is preferred that the polyelectrolyte, alcohol(s) and water be respectively contained in an amount of 0.1 to 2.0 parts by weight, an amount of 0.01 to 2.0 parts by weight and an amount of 2.0 to 20.0 parts by weight with respect to 1.0 parts by weight of the electrode catalyst. It is more preferred that the polyelectrolyte, alcohol(s) and water be respectively contained in an amount of 0.3 to 1.0 parts by weight, an amount of 0.1 to 2.0 parts by weight and an amount of 5.0 to 6.0 parts by weight with respect to 1.0 parts by weight of the electrode catalyst. It is preferred that the composition of each component be within the abovementioned ranges, because when the composition of each component is within these ranges, not only a coating film made of the composition for forming gas diffusion electrode will not be spread extremely extensively on the gas diffusion electrode at the time of forming the film, but the coating film formed of the composition for forming gas diffusion electrode is also allowed to have an appropriate and uniform thickness.

Here, the weight of the polyelectrolyte refers to a weight when it is dry i.e. a weight without a solvent in a polyelectrolyte solution, whereas the weight of water refers to a weight including a water contained in the polyelectrolyte solution.

<Gas Diffusion Electrode>

The gas diffusion electrode (200a, 200b) of the present invention has a gas diffusion layer 220; and an electrode catalyst layer 240 laminated on at least one surface of the gas diffusion layer 220. The aforementioned electrode catalyst is contained in the electrode catalyst layer 240 equipped to the gas diffusion electrode (200a, 200b). The gas diffusion electrode 200 of the present invention can be used as an anode and an cathode.

In FIG. 10, the gas diffusion electrode 200 on the upper side is referred to as the anode 200a, whereas the gas diffusion electrode 200 on the lower side is referred to as the cathode 200b for the sake of convenience.

(Electrode Catalyst Layer)

In the case of the anode 200a, the electrode catalyst layer 240 serves as a layer where a chemical reaction of dissociating a hydrogen gas sent from the gas diffusion layer 220 into hydrogen ions takes place due to the function of the electrode catalyst 1 contained in the electrode catalyst layer 240. Further, in the case of the cathode 200b, the electrode catalyst layer 240 serves as a layer where a chemical reaction of bonding an air (oxygen gas) sent from the gas diffusion layer 220 and the hydrogen ions that have traveled from the anode through the electrolyte membrane takes place due to the function of the electrode catalyst 1 contained in the electrode catalyst layer 240.

The electrode catalyst layer 240 is formed using the abovementioned composition for forming gas diffusion electrode. It is preferred that the electrode catalyst layer 240 have a large surface area such that the reaction between the electrode catalyst 1 and the hydrogen gas or air (oxygen gas) sent from the diffusion layer 220 is allowed take place to the fullest extent. Moreover, it is preferred that the electrode catalyst layer 240 be formed in a manner such that the electrode catalyst layer 240 has a uniform thickness as a whole. Although the thickness of the electrode catalyst layer 240 can be appropriately adjusted and there are no restrictions on such thickness, it is preferred that the electrode catalyst layer 240 have a thickness of 2 to 200 µm.

(Gas Diffusion Layer)

The gas diffusion layer 220 equipped to the gas diffusion electrode 200 serves as a layer provided to diffuse to each of the corresponding electrode catalyst layers 240 the hydrogen gas introduced from outside the fuel cell stack S into gas flow passages that are formed between the separator 100a and the gas diffusion layer 220a; and the air (oxygen gas) introduced from outside the fuel cell stack S into gas passages that are formed between the separator 100b and the gas diffusion layer 220b. In addition, the gas diffusion layer 220 plays a role of supporting the electrode catalyst layer 240 to the gas diffusion electrode 200 so as to immobilize the electrode catalyst layer 240 to the surface of the gas diffusion electrode 220. The gas diffusion layer 220 also plays a role of improving the contact between the electrode catalyst 1 contained in the electrode catalyst layer 240 and the hydrogen gas as well as air (oxygen gas).

The gas diffusion layer 220 has a function of favorably passing the hydrogen gas or air (oxygen gas) supplied from the gas diffusion layer 220 and then allowing such hydrogen gas or air to arrive at the electrode catalyst layer 240. For this reason, it is preferred that the gas diffusion layer 220 have a water-repellent property such that a pore structure as a microstructure in the gas diffusion layer 220 will not be blocked by the electrode catalyst 1 and a water generated at the cathode 200b. Therefore, the gas diffusion layer 220 has a water repellent component such as polyethylene terephthalate (PTFE).

There are no particular restrictions on a material(s) that can be used in the gas diffusion layer 220. That is, there can be employed a material(s) known to be used in a gas diffusion layer of a fuel cell electrode. For example, there may be used a carbon paper; or a material made of a carbon paper as a main raw material and an auxiliary raw material applied to the carbon paper as the main raw material, such auxiliary raw material being composed of a carbon powder as an optional ingredient, an ion-exchange water also as an optional ingredient and a polyethylene terephthalate dispersion as a binder. The thickness of the gas diffusion layer can be appropriately determined based on, for example, the size of a cell used in a fuel cell. While there are no particular restrictions on the thickness of the gas diffusion layer, a thin gas diffusion layer is preferred for the purpose of ensuring a short diffusion distance of a reactant gas. Meanwhile, since it is required that the gas diffusion layer also exhibit a mechanical strength at the time of performing coating and during an assembly process, there is usually used a gas diffusion layer having a thickness of about 50 to 300 µm, for example.

As for the gas diffusion electrodes 200a and 200b, an intermediate layer (not shown) may be provided between the gas diffusion layer 220 and the electrode catalyst layer 240. In such case, each of the gas diffusion electrodes 200a and 200b has a three-layered structure composed the gas diffusion layer, the intermediate layer and the catalyst layer.

(Production Method of Gas Diffusion Electrode)

A production method of the gas diffusion electrode is described hereunder.

The production method of the gas diffusion electrode includes a step of applying to the gas diffusion layer 220 the composition for forming gas diffusion electrode; and a step of forming the electrode catalyst layer 240 by drying such gas diffusion layer 220 to which the composition for forming gas diffusion electrode has been applied. Specifically, the composition for forming gas diffusion electrode contains the ionomer solution composed of the electrode catalyst 1 with the catalyst components supported on the support; a hydrogen ion-conductive polyelectrolyte; a water; and an alcohol (s).

The important point when applying to the gas diffusion layer 220 the composition for forming gas diffusion electrode is that the composition for forming gas diffusion electrode is to be homogeneously applied to the gas diffusion layer 220. As a result of homogeneously applying the composition for forming gas diffusion electrode, there can be formed on the gas diffusion layer 220 a coating film that has a uniform thickness and is made of the composition for forming gas diffusion electrode. Although an application quantity of the composition for forming gas diffusion electrode can be appropriately determined based on a mode of usage of the fuel cell, it is preferred that the quantity be 0.1 to 0.5 (mg/cm$^2$) in terms of the amount of an active metal such as platinum contained in the electrode catalyst layer 240, from the perspective of a cell performance of a fuel cell having a gas diffusion electrode.

Next, after applying to the gas diffusion layer 220 the composition for forming gas diffusion electrode, the coating film of the composition for forming gas diffusion electrode that has been applied to the gas diffusion layer 220 is dried so as to form the electrode catalyst layer 240 on the gas diffusion layer 220. By heating the gas diffusion layer 220 on which the coating film of the composition for forming gas diffusion electrode has been formed, the water and alcohol (s) in the ionomer solution contained in the composition for forming gas diffusion electrode will be evaporated and thus disappear from the composition for forming gas diffusion electrode. As a result, in the step of applying the composition for forming gas diffusion electrode, the coating film of the composition for forming gas diffusion electrode that is formed on the gas diffusion layer 220 becomes the electrode catalyst layer 240 containing the electrode catalyst and polyelectrolyte.

<Membrane-Electrode Assembly (MEA)>

The membrane-electrode assembly 400 of the present invention (Membrane Electrode Assembly, abbreviated as MEA hereunder) has the anode 200a and cathode 200b which serve as the gas diffusion electrodes 200 using the electrode catalyst 1; and the electrolyte membrane 300 dividing these electrodes. The membrane-electrode assembly (MEA) 400 can be produced by stacking the anode 200a, the electrolyte membrane 300 and the cathode 200b in an order of anode 200a, electrolyte 300 and cathode 200b, and then pressure-bonding the same.

<Fuel Cell Stack>

As for the fuel cell stack S of the present invention, the one-unit cell (single cell) is established with the separator 100a (anode side) being attached to an outer side of the anode 200a of the membrane-electrode assembly (MEA) 400 obtained, and with the separator 100b (cathode side) being attached to an outer side of the cathode 200b of the membrane-electrode assembly (MEA) 400, respectively. Further, the fuel cell stack S is obtained by integrating such one-unit cells (single cells). Furthermore, a fuel cell system is completed by attaching a peripheral device(s) to the fuel cell stack S and assembling the same.

WORKING EXAMPLE

The present invention is described in greater detail hereunder with reference to working examples. However, the present invention is not limited to the following working examples.

Here, the inventors of the present invention confirmed that iodine (I) species was not detected from the catalysts of the working and comparative examples, when employing the X-ray fluorescence (XRF) spectroscopy.

Further, unless otherwise noted in the description of each step of the following production method, these steps were carried out under a room temperature and in the air.

Production of Electrode Catalyst Precursor

Production Example 1

The electrode catalyst was produced by the electrode catalyst production method of the present invention through following process. The raw materials of the electrode catalyst that were used in the production examples are as follows.

Carbon black powder: product name "Ketjen Black EC300" (by Ketjen Black International Co.)

Sodium tetrachloropalladate (II)

Palladium nitrate

Potassium chloroplatinate

[Preparation of Palladium-Supported Carbon]

As a support of the electrode catalyst, there was used a carbon black powder which was dispersed in a water to prepare a dispersion liquid of 5.0 g/L. An aqueous solution of sodium tetrachloropalladate (II) (concentration 20% by mass) of 5 mL was then delivered by drops into and mixed with such dispersion liquid. An aqueous solution of sodium formate (100 g/L) of 100 mL was further delivered by drops into a dispersion liquid thus obtained, followed by taking the insoluble components through filtering and then washing the taken insoluble components with a pure water. After performing drying, there was then obtained a palladium (core)-supported carbon with palladium being supported on carbon black.

[Copper (Cu) Covering Palladium (Core)]

An aqueous solution of copper sulfate of 50 mM was poured into a three-electrode electrolytic cell. A reasonable amount of the palladium-supported carbon prepared above was then added to such three-electrode electrolytic cell, followed by stirring the same and then allowing the three-electrode electrolytic cell to stand still. 450 mV (pair reversible hydrogen electrode) was applied to the working electrode in a resting state such that copper (Cu) could uniformly coat the palladium of the palladium-supported carbon. This is defined as a copper-palladium supported carbon.

[Platinum (Pt) Covering Palladium (Core)]

An aqueous solution of potassium chloroplatinic acid was delivered by drops into the solution containing the copper-palladium supported carbon with palladium being coated by copper, the aqueous solution of potassium chloroplatinic acid containing platinum (Pt) in an amount two-fold equivalent of the coating copper in terms of substance amount ratio. In this way, the copper (Cu) of the copper-palladium supported carbon was replaced with platinum (Pt)

[Pretreatment]

Step (P1): A P1 liquid was prepared by dispersing in ultrapure water an undried powder of platinum palladium-supported carbon particles produced by substituting copper (Cu) of the above-obtained copper-palladium supported carbon with platinum (Pt).

Step (P2): The P1 liquid was filtrated and washed with the ultrapure water, using a filtration device. Washing was repeated until the electric conductivity of the filtrate obtained after washing had become not higher than 10 µS/cm. An electrode catalyst precursor thus obtained was then dispersed in the ultrapure water to obtain an electrode catalyst precursor-ultrapure water dispersion liquid (I).

Step (P3): Next, the dispersion liquid (I) was filtrated, and a filtration residue thus obtained was dried in the air at 70° C. and for about 24 hours. In this way, the electrode catalyst precursor 1 obtained in the production example 1 was produced.

Production Examples 2 to 5

Electrode catalyst precursors 2 to 5 of production examples 2 to 5 were respectively obtained in a similar manner as the production example 1 except that the supported amounts of platinum (Pt) and palladium (Pd) contained in the electrode catalyst became those represented by the concentrations (% by mass concentration) as set forth in the working example 5, comparative example 2, comparative example 3 and comparative example 4 of Table 2.

As described later, as for the electrode catalyst precursors 1 to 5, it was confirmed that their chlorine (Cl) species concentrations, as measured by XRF spectroscopy, were not lower than 6,000 ppm as set forth in Table 2.

Thus, in the following working examples, the first chlorine (Cl) species concentration of the electrode catalyst precursor as the raw material is 6,000 ppm.

Production of Electrode Catalyst

Working Example 1

First Step

The pretreated electrode catalyst precursor 1 obtained was taken by an amount of 5.0 g, and was put into a container. Next, ultrapure water of 1,000 mL was added to such container to reslurry the pretreated electrode catalyst precursor 1, followed by retaining an aqueous dispersion liquid thus obtained while stirring the same at a room temperature (25° C.) for about 240 min.

Second Step to Third Step

Ultrapure water was used to perform filtration to take the insoluble components contained in the dispersion liquid, and then wash the same. Washing was repeated until the electric conductivity of the filtrate obtained after washing had become not higher than 10 µS/cm, and an electrode catalyst precursor obtained was then dispersed in the ultrapure water to prepare an electrode catalyst precursor-ultrapure water dispersion liquid (ii).

The dispersion liquid (ii) was filtrated, and a filtration residue obtained was dried in the air at 70° C. for about 24 hours, thereby obtaining the electrode catalyst. The electrode catalyst obtained in the working example 1 was defined as a catalyst 1.

[Measurement of Supported Amount]

With regard to the catalyst 1, the amounts (% by mass) of the platinum and palladium supported were measured by the following method.

The catalyst 1 was immersed in an aqua regia to dissolve the metal. Then, carbon as an insoluble component was removed from the aqua regia. Next, the aqua regia from which carbon had been removed was subjected to ICP analysis.

The results of ICP analysis were that a platinum supporting amount was 20.9% by mass, and a palladium supporting amount was 22.5% by mass.

Working Example 2

Fourth Step

The catalyst 1 obtained in the production example 1 was taken by an amount of 5.0 g, and was put into a container. Next, ultrapure water of 1,000 (mL) was added to such container, and an aqueous dispersion liquid obtained as a result of reslurrying the catalyst 1 was then retained while being stirred at a room temperature (25° C.) for about 240 min.

Fifth Step to Sixth Step

An electrode catalyst was obtained in a similar manner as the second and third steps of the working example 1 except that the temperature of the ultrapure water used to perform washing in the second step was set to be 80° C. The electrode catalyst obtained in the working example 2 was defined as a catalyst 2.

ICP analysis was performed on the catalyst 2 in an similar manner as the working example 1 to measure the supported amount of platinum and the supported amount of palladium that are shown in Table 2.

Working Example 3

An electrode catalyst was obtained in a similar manner as the working example 2 except that there was carried out the seventh step between the fifth step and the sixth step in the working example 2, where an electrode catalyst-ultrapure water dispersion liquid (iv) obtained in the fifth step was retained at 90° C. for about 240 min. The electrode catalyst obtained in the working example 3 was defined as a catalyst 3.

ICP analysis was performed on the catalyst 3 in an similar manner as the working example 1 to measure the supported amount of platinum and the supported amount of palladium that are shown in Table 2.

Working Example 4

In the working example 1, the electrode catalyst precursor 1 was retained in a sulfuric acid aqueous solution of 0.05 M while being stirred at a room temperature (25° C.) for about 60 min, before carrying out the first step.

Washing was repeated until the electric conductivity of the filtrate obtained after the above treatment had become not higher than 10 µS/cm, and a filtration residue obtained was then dispersed in ultrapure water.

Next, such dispersion liquid was filtrated, and a filtration residue obtained was dried at 70° C. in the air for about 24 hours.

An electrode catalyst was obtained in a similar manner as the working example 1 except that the abovementioned steps were carried out. The electrode catalyst obtained in the working example 4 was defined as a catalyst 4.

ICP analysis was performed on the catalyst 4 in an similar manner as the working example 1 to measure the supported amount of platinum and the supported amount of palladium that are shown in Table 2.

Working Example 5

In the working example 5, there was used the electrode catalyst precursor 2 instead of the electrode catalyst precursor 1, and an electrode catalyst was prepared in accordance with the following procedure. That is, in the working example 1, the electrode catalyst precursor 2 was retained in a sulfuric acid aqueous solution of 1.0 M while being stirred at a room temperature (25° C.) for about 60 min, before carrying out the first step.

Washing was repeated until the electric conductivity of the filtrate obtained after the above treatment had become not higher than 10 µS/cm, and a filtration residue obtained was then dispersed in ultrapure water.

Next, such dispersion liquid was filtrated, and a filtration residue obtained was dried at 70° C. in the air for about 24 hours.

Later, a treatment was performed with an oxalic acid aqueous solution (0.3 M) of a temperature of 90° C.

Washing was then repeated until the electric conductivity of the filtrate obtained after the above treatment had become not higher than 10 µS/cm, and a filtration residue obtained was then dispersed in ultrapure water.

Next, such dispersion liquid was filtrated, and a filtration residue obtained was dried at 70° C. in the air for about 24 hours.

An electrode catalyst was obtained in a similar manner as the working example 1 except that the abovementioned steps were carried out. The electrode catalyst obtained in the working example 5 was defined as a catalyst 5.

ICP analysis was performed on the catalyst 5 in an similar manner as the working example 1 to measure the supported amount of platinum and the supported amount of palladium that are shown in Table 2.

Comparative Examples 1 to 4

The electrode catalyst precursors 1, 3, 4 and 5 that were produced in the production examples 1, 3, 4 and 5 were defined as the electrode catalysts of comparative examples 1 to 4.

<Evaluation of Electrode Catalysts>
(Concentrations of Chlorine (Cl) Species)

X-ray fluorescence (XRF) spectrometry was employed to measure the concentrations of the chlorine (Cl) species of the electrode catalysts that are obtained in the working examples 1 to 5, and the comparative examples 1 to 4. The concentrations of the chlorine species in the electrode catalysts were measured using the wavelength dispersive fluorescent X-ray analyzer Axios (by Spectris Co., Ltd.). Specifically, the measurement was carried out through the following procedure.

A measurement sample of the electrode catalyst was placed in a XRF sample container equipped to the wavelength dispersive fluorescent X-ray analyzer. The XRF sample container in which the measurement sample of the electrode catalyst had been placed was then put into an XRF sample chamber, followed by replacing an atmosphere in the XRF sample chamber with a helium gas. Later, fluorescent X-ray measurement was conducted under the helium gas atmosphere (normal pressure).

As a software, there was used "UniQuant5" which is an analytic software for use in wavelength dispersive fluorescent X-ray analyzer. A measurement condition(s) were set to "UQ5 application" in accordance with the analytic software "UniQuant5," where calculation is performed in a mode with the main component of the measurement sample of the electrode catalyst being "carbon (constituent element of electrode catalyst support)" and with a sample analysis result-display format being "element." Measurement results were analyzed using the analytic software "UniQuant5" such that the concentrations of chlorine (Cl) species were able to be calculated. The measurement results are shown in Table 2.

TABLE 2

|  |  | electrode catalyst precursor | Pt/% by mass | Pd/% by mass | Chlorine species concentration/ppm |
|---|---|---|---|---|---|
| Working examples | 1 | 1 | 20.9 | 22.5 | 4200 |
|  | 2 |  | 20.9 | 22.5 | 3400 |
|  | 3 |  | 20.9 | 22.5 | 1900 |
|  | 4 |  | 20.9 | 22.5 | 3100 |
|  | 5 | 2 | 21.0 | 23.0 | 2200 |
| Comparative examples | 1 | 1 | 20.9 | 22.5 | 6900 |
|  | 2 | 3 | 24.3 | 21.2 | 8500 |
|  | 3 | 4 | 23.5 | 21.5 | 7800 |
|  | 4 | 5 | 19.5 | 24.2 | 6000 |

According to Table 2, the following became evident. That is, as for the production method of the electrode catalyst of the present invention, even when employing as a raw material an electrode catalyst precursor containing high-concentration chlorine (Cl) species, by applying the particular chlorine (Cl) species elimination method to such electrode catalyst precursor, there can be easily produced an electrode catalyst whose chlorine (Cl) species concentration has been greatly reduced not only to a concentration of less than 6,000 ppm, but also to a concentration of not higher than 5,000 ppm, or even to a concentration level of about 2,000 to about 4,000 ppm, even in the case where the chlorine (Cl) species concentration of the electrode catalyst precursor is not lower than 6,000 ppm (i.e. when the first chlorine (Cl) species concentration or the second chlorine (Cl) species concentration is not lower than 6,000 ppm).

As shown in Table 2, the amount of the chlorine (Cl) species contained in the electrode catalyst precursor 2 was not measured. However, since the electrode catalyst precursor 2 was prepared by a similar method as that of the other electrode catalyst precursors 1, 3 and 4 except that the electrode catalyst precursor 2 had a different Pt supported amount and a different Pd supported amount, it can be easily speculated that the electrode catalyst precursor 2 had the same level of numerical values as the electrode catalyst precursors 1, 3 and 4 (comparative examples 1, 2 and 3).

These results indicate that the production method of the electrode catalyst of the present invention is suitable for mass production and reducing the production costs.

According to the production method of the electrode catalyst of the present invention, even when using an electrode catalyst precursor having a high-concentration chlorine (Cl) species content, there can be obtained an electrode catalyst whose chlorine (Cl) species content has been reliably and sufficiently reduced, through relatively simple operations.

Further, the production method of the electrode catalyst of the present invention is capable of simplifying the production process and reducing the production costs.

For these reasons, the present invention is a production method of electrode catalyst that can be used not only in fuel-cell vehicles and electrical equipment industries such as those related to cellular mobiles, but also in Ene farms, cogeneration systems or the like. Thus, the electrode catalyst of the present invention shall make contributions to the energy industries and developments related to environmental technologies.

The invention claimed is:

1. A production method of an electrode catalyst having a core-shell structure including a support, a core part formed on said support and a shell part formed to cover at least a part of a surface of said core part, comprising:
    a first step (1) of preparing a first liquid with an electrode catalyst precursor (I) being dispersed in ultrapure water by adding said electrode catalyst precursor (I) to the ultrapure water, said electrode catalyst precursor (I) being produced using a material containing chlorine (Cl) species, and exhibiting a chlorine (Cl) species concentration not lower than a predetermined first chlorine (Cl) species concentration when measured by X-ray fluorescence (XRF) spectroscopy; and
    a second step (2) of preparing a second liquid by dispersing an electrode catalyst precursor (II) in ultrapure water, said electrode catalyst precursor (II) being obtained by filtrating and washing said electrode catalyst precursor (I) contained in said first liquid with ultrapure water, and then repeatedly performing washing until an electric conductivity ρ of a filtrate obtained after washing has become a first predetermined value or lower when measured by a JIS-standard testing method (JIS K0552).

2. The production method of the electrode catalyst according to claim 1, wherein said first chlorine (Cl) species concentration is 6,000 ppm.

3. The production method of the electrode catalyst according to claim 1, wherein said first predetermined value is a value selected from a range of not higher than 100 μS/cm.

4. The production method of the electrode catalyst according to claim 1, wherein said electrode catalyst precursor (I) used in said first step is subjected to a pretreatment process comprising:
    a step (P1) of preparing a P1 liquid with an electrode catalyst precursor (PI) being dispersed in ultrapure water by adding said electrode catalyst precursor (PI) to the ultrapure water, said electrode catalyst precursor (PI) being produced using a material containing chlorine (Cl) species, and exhibiting a chlorine (Cl) species concentration not lower than a predetermined second chlorine (Cl) species concentration when measured by X-ray fluorescence (XRF) spectroscopy;
    a step (P2) of preparing a P2 liquid by dispersing an electrode catalyst precursor (PII) in ultrapure water, said electrode catalyst precursor (PII) being obtained by filtrating and washing said electrode catalyst precursor (PI) contained in said P1 liquid with ultrapure water, and then repeatedly performing washing until an electric conductivity ρ of a filtrate obtained after washing has become a predetermined value of the step P1 or lower when measured by the JIS-standard testing method (JIS K0552); and
    a step (P3) of drying said P2 liquid.

5. The production method of the electrode catalyst according to claim 4, wherein said second chlorine (Cl) species concentration is 6,000 ppm.

6. The production method of the electrode catalyst according to claim 4, wherein said predetermined value of the step P1 is a value selected from the range of not higher than 100 μS/cm.

7. The production method of the electrode catalyst according to claim 1, further comprising a third step (3) of drying said second liquid obtained after said second step.

8. The production method of the electrode catalyst according to claim 7, further comprising a fourth step (4) of preparing a third liquid with said electrode catalyst precursor (II) being dispersed in ultrapure water, by adding said electrode catalyst precursor (II) obtained after said third step (3) to the ultrapure water.

9. The production method of the electrode catalyst according to claim 8, further comprising:
    a fifth step (5) of preparing, after said fourth step (4),
    a fourth liquid with an electrode catalyst precursor (IV) being dispersed in ultrapure water, said electrode catalyst precursor (IV) being obtained by filtrating and washing an electrode catalyst precursor (III) contained in said third liquid with ultrapure water of a temperature of 60° C. to a boiling point thereof, and then repeatedly performing washing until an electric conductivity ρ of a filtrate obtained after washing has become a second predetermined value or lower; and
    a sixth step (6) of drying said fourth liquid.

10. The production method of the electrode catalyst according to claim 9, wherein said second predetermined value is a value selected from the range of not higher than 100 μS/cm.

11. The production method of the electrode catalyst according to claim 9, further comprising a seventh step (7) established between said fifth step (5) and said drying step (6), said seventh step (7) allowing said fourth liquid to be retained under at least one stage of a temperature predetermined within a range of 60° C. to a boiling point thereof for a predetermined retention time.

12. The production method of the electrode catalyst according to claim 1, further comprising a first step' (1') established before said first step, said first step' (1') allowing an electrode catalyst precursor (I0) to be dispersed in an aqueous solution obtained by adding to ultrapure water at least one kind of acid selected from the group consisting of a sulfuric acid and a nitric acid, and then retained under at least one stage of a temperature predetermined within a range of 10 to 95° C. for a predetermined retention time.

13. The production method of the electrode catalyst according to claim 1, wherein said shell part contains at least one metal selected from platinum (Pt) and a platinum (Pt) alloy, and said core part contains at least one metal selected from the group consisting of palladium (Pd), a palladium (Pd) alloy, a platinum (Pt) alloy, gold (Au), nickel (Ni) and a nickel (Ni) alloy.

14. The production method of the electrode catalyst according to claim 13, wherein a platinum (Pt) chloride is used as a raw material of a metal constituting said shell part.

15. The production method of the electrode catalyst according to claim 1, wherein said shell part has:

a first shell part formed to cover at least a part of the surface of said core part; and a second shell part formed to cover at least a part of a surface of said first shell part.

16. The production method of the electrode catalyst according to claim 15, wherein a platinum (Pt) chloride is used as a raw material of a metal constituting said second shell part.

17. The production method of the electrode catalyst according to claim 1, further comprising a third step (3) of drying said second liquid obtained after said second step, wherein said electrode catalyst precursor (I) used in said first step is subjected to a pretreatment process comprising:

a step (P1) of preparing a P1 liquid with an electrode catalyst precursor (PI) being dispersed in ultrapure water by adding said electrode catalyst precursor (PI) to the ultrapure water, said electrode catalyst precursor (PI) being produced using a material containing chlorine (Cl) species, and exhibiting a chlorine (Cl) species concentration not lower than a predetermined second chlorine (Cl) species concentration when measured by X-ray fluorescence (XRF) spectroscopy;

a step (P2) of preparing a P2 liquid by dispersing an electrode catalyst precursor (PII) in ultrapure water, said electrode catalyst precursor (PII) being obtained by filtrating and washing said electrode catalyst precursor (PI) contained in said P1 liquid with ultrapure water, and then repeatedly performing washing until an electric conductivity $\rho$ of a filtrate obtained after washing has become a predetermined value of the step P1 or lower when measured by the JIS-standard testing method (JIS K0552); and a step (P3) of drying said P2 liquid.

18. The production method of the electrode catalyst according to claim 17, further comprising a fourth step (4) of preparing a third liquid with said electrode catalyst precursor (II) being dispersed in ultrapure water, by adding said electrode catalyst precursor (II) obtained after said third step (3) to the ultrapure water.

19. The production method of the electrode catalyst according to claim 18, further comprising:

a fifth step (5) of preparing, after said fourth step (4), a fourth liquid with an electrode catalyst precursor (IV) being dispersed in ultrapure water, said electrode catalyst precursor (IV) being obtained by filtrating and washing an electrode catalyst precursor (III) contained in said third liquid with ultrapure water of a temperature of 60° C. to a boiling point thereof, and then repeatedly performing washing until an electric conductivity $\rho$ of a filtrate obtained after washing has become a second predetermined value or lower; and a sixth step (6) of drying said fourth liquid.

20. The production method of the electrode catalyst according to claim 19, further comprising a seventh step (7) established between said fifth step (5) and said drying step (6), said seventh step (7) allowing said fourth liquid to be retained under at least one stage of a temperature predetermined within a range of 60° C. to a boiling point thereof for a predetermined retention time.

* * * * *